US012762525B1

(12) United States Patent
Maselli

(10) Patent No.: US 12,762,525 B1
(45) **Date of Patent: *Oct. 13, 2026**

(54) ESTABLISHING SALES TAX EXEMPTION STATUS IN AN ELECTRONIC MARKETPLACE ENVIRONMENT

(71) Applicant: Avalara, Inc., Seattle, WA (US)

(72) Inventor: Michael J. Maselli, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 296 days.

This patent is subject to a terminal disclaimer.

(21) Appl. No.: 17/902,675

(22) Filed: Sep. 2, 2022

Related U.S. Application Data

(63) Continuation of application No. 16/743,107, filed on Jan. 15, 2020, now Pat. No. 11,468,421.

(60) Provisional application No. 62/861,744, filed on Jun. 14, 2019.

(51) Int. Cl.
*G06Q 20/20* (2012.01)
*G06Q 30/0601* (2023.01)
*G06Q 40/00* (2023.01)

(52) U.S. Cl.
CPC ....... *G06Q 20/207* (2013.01); *G06Q 30/0641* (2013.01); *G06Q 40/00* (2013.01); *G06Q 20/206* (2013.01)

(58) Field of Classification Search
CPC ............. G06Q 20/207; G06Q 30/0641; G06Q 20/206; G06Q 40/00
See application file for complete search history.

(56) References Cited

U.S. PATENT DOCUMENTS

| | | | | |
|---|---|---|---|---|
| 6,873,992 | B1 | 3/2005 | Thomas | |
| 7,319,982 | B1 | 1/2008 | Ryan et al. | |
| 7,716,093 | B2 | 5/2010 | Johnson et al. | |
| 7,783,536 | B2 | 8/2010 | William et al. | |
| 7,933,803 | B1 | 4/2011 | Nadler et al. | |
| 8,266,014 | B1 | 9/2012 | Bhosle et al. | |
| 8,407,110 | B1 * | 3/2013 | Joseph ............... | G06Q 30/0633 705/26.81 |
| 8,612,304 | B1 | 12/2013 | Lin et al. | |
| 8,620,578 | B1 | 12/2013 | Brown et al. | |
| 8,725,407 | B2 | 5/2014 | Hurley et al. | |
| 9,760,915 | B2 | 9/2017 | Pavlou et al. | |
| 10,445,818 | B1 | 10/2019 | Chowdhary | |
| 10,467,557 | B1 | 11/2019 | Kodesh et al. | |
| 10,769,611 | B2 | 9/2020 | Mcneel | |
| 11,238,542 | B1 | 2/2022 | Wixted et al. | |
| 11,341,507 | B2 | 5/2022 | Maselli et al. | |
| 11,468,421 | B1 * | 10/2022 | Maselli ................ | G06Q 20/207 |
| 2002/0138765 | A1 | 9/2002 | Fishman et al. | |

(Continued)

OTHER PUBLICATIONS

"Avalara Launches New Products to Automate Sales Tax Exemption Certificate Management", Retrieved from Internet <https://www.digitalcommerce360.com/2015/05/11/avalara-launches-new-products-automate-sales-tax-exemption/>, May 11, 2015, 5 pages.

(Continued)

*Primary Examiner* — Garcia Ade
(74) *Attorney, Agent, or Firm* — Jeremiah J. Baunach; Frontier IP Law PLLC

(57) ABSTRACT

Embodiments of the invention relate to generating and obtaining multiple exemption certificates for multiple sellers in a single transaction, and methods and systems for performing the same.

13 Claims, 14 Drawing Sheets

(56) References Cited

U.S. PATENT DOCUMENTS

| | | | | |
|---|---|---|---|---|
| 2003/0078880 | A1 | 4/2003 | Alley | |
| 2004/0230490 | A1 | 11/2004 | Barsade et al. | |
| 2006/0085275 | A1 * | 4/2006 | Stokes | G06Q 40/02 705/27.1 |
| 2007/0094104 | A1 | 4/2007 | Reahard | |
| 2007/0136158 | A1 | 6/2007 | Rawlings et al. | |
| 2007/0136159 | A1 | 6/2007 | Rawlings et al. | |
| 2008/0115064 | A1 | 5/2008 | Roach et al. | |
| 2009/0132389 | A1 | 5/2009 | Klinger et al. | |
| 2013/0013471 | A1 | 1/2013 | Fishman | |
| 2013/0174181 | A1 * | 7/2013 | Jentsch | G06F 9/451 719/328 |
| 2014/0006231 | A1 | 1/2014 | Salgueiro et al. | |
| 2014/0337134 | A1 | 11/2014 | Bugenhagen | |
| 2017/0004422 | A1 | 1/2017 | Todd | |
| 2017/0083983 | A1 | 3/2017 | Yamaguchi | |
| 2017/0083984 | A1 | 3/2017 | Yamaguchi et al. | |
| 2018/0240091 | A1 * | 8/2018 | Mochizuki | G07G 1/0045 |
| 2018/0268420 | A1 | 9/2018 | Maselli et al. | |
| 2019/0340703 | A1 | 11/2019 | West et al. | |

OTHER PUBLICATIONS

Alavara , “Screen Captures and Transcript from Youtube video clip entitled: Alavara CertCapture for eCommerce”, uploaded on Jul. 28, 2016, Retrieved from Internet: <https://www.youtube.com/watch?v=jLROD6_xpXE>, 2016., 2016, 24 pages.

Bruce, Donald, et al., “An analysis of Internet sales taxation and the small seller exemption”, BA Research Summary 416.4 (2013), 2013.

Einav, Liran et al., “Sales Taxes and Internet Commerce!”, 2012.

Maselli, Michael, “Establishing Sales Tax Exemption Status in a Retail Marketplace Environment”, U.S. Appl. No. 62/861,744, Inventor Michael Maselli, filed Jun. 14, 2019, 12 pages.

* cited by examiner

FIG. 9
900
Choose the states for which you claim exemption:
Alabama
Alaska
Arizona
Arkansas
California
Colorado
Connecticut
Delaware
Florida
Georgia
Hawaii
Idaho
Illinois
Indiana
Iowa
Kansas
Kentucky
Louisiana
Maine
Maryland
Massachusetts
Michigan
Minnesota
Mississippi
Missouri
Montana
Nebraska
Nevada
New Hampshire
New Jersey
New Mexico
New York
North Carolina
North Dakota
Ohio
Oklahoma
Oregon
Pennsylvania
Rhode Island
South Carolina
South Dakota
Tennessee
Texas
Utah
Vermont
Virginia
Washington
West Virginia
Wisconsin
Wyoming
Continue

ESTABLISHING SALES TAX EXEMPTION STATUS IN AN ELECTRONIC MARKETPLACE ENVIRONMENT

BACKGROUND

When businesses sell or buy goods, they are required by law to compute the amounts of money they owe as taxes to various tax jurisdictions, and then pay these amounts to the tax jurisdictions. If they fail to accurately report and pay taxes they owe, they may be subject to audits and fines—ignorance of the law is not an excuse.

There are many types of taxes for such businesses. Such taxes include sales tax, use tax, excise tax, value-added tax, industry-specific taxes, cross-border taxes, and so on. Further, for a single transaction, taxes may be due to more than one tax jurisdiction, such as states, localities within the states, etc.

Determining the taxes due is often very complex. There are over 10,000 tax jurisdictions in the US, and almost 10 million taxability rules related to various products and services. Complexities in determining the sales tax due may arise from the location of the buyer, the seller, a distributor, etc. For example, some state and local authorities tax have origin-based rules, which means that a sales tax is charged from the seller's location; other state and local authorities tax have destination-based rules, which means that a sales tax is charged from the buyer's location.

Additional complexities arise from the fact that different tax jurisdictions charge different percentage rates. These different tax jurisdictions can be different states, counties, cities, municipalities, special taxing jurisdictions, and so on.

In addition to the cost of the tax, sellers of goods are subjected to many requirements about the taxes they owe. In particular, a seller must determine whether, and when, they must collect taxes in each tax jurisdiction. For example, for each state, a seller may need to register with that state's taxing agency, set up internal processes for collecting sales tax in accordance with the tax rules of the state, keep records for the collected sales tax, file reports with the state, and finally pay the tax to the state.

Sellers may further try to look for instances when they do not owe sales tax. For a first example, in some instances a tax jurisdiction may offer a temporary tax holiday. For a second example, a tax jurisdiction may exempt the sale of certain products and services from sales tax, but even that is not uniform across states; for instance, in 2018, the sale of cowboy boots was exempt from sales tax in Texas, but not in New York. For a third example, when a seller buys certain items for resale, the transaction may be exempt from sales tax, as long as the seller creates and maintains proper certificates to that effect.

Businesses generally collect information relating to their operations, such as by using enterprise resource planning ("ERP") software applications and accounting applications. ERP applications manage information relating to a business's activities, such as sales, resource management, production, inventory management, delivery, billing, and so on. Accounting applications manage a business's accounting information, such as purchase orders, sales invoices, payroll, accounts payable, accounts receivable, and so on.

ERP applications, accounting applications, ecommerce applications and other conventionally used applications generally cannot provide accurate tax information, such as when transactions are complex or span geographical boundaries. In particular, such applications may over- or under-estimate tax owed to governments, for example by failing to consider municipal taxes. Moreover, such applications generally do not provide an ability for businesses to model the impact that various contemplated changes may have on the business's bottom line. As an example, these applications cannot model the impact on taxes of transferring production of goods from one geographical area to another, effectively changing the tax jurisdiction.

SUMMARY

Embodiments of the invention relate to generating and obtaining multiple exemption certificates for multiple sellers in a single transaction, and methods and systems for performing the same. At least some of the data for completing the exemption certificates may be provided from pre-stored data associated with buyer and sellers in the transaction.

A computer-implemented method for a service platform is disclosed. The computer-implemented method includes storing first item data of a first item sold by a first seller, first identity data of the first seller, second item data of a second item sold by a second seller, and second identity data of the second seller. The computer-implemented method includes facilitating a buyer to form a request to buy the first item and the second item, the request to buy including the first item data and the second item data, in a transaction. The computer-implemented method includes receiving, from the buyer via a user interface, an exemption request for the single transaction. The computer-implemented method includes receiving buyer identity data of the buyer in connection with the exemption request. The computer-implemented method includes procuring, in response to the exemption request, a first exemption certificate including at least some of the first identity data and at least some of the buyer identity data, and a second exemption certificate including at least some of the second identity data and at least some of the buyer identity data. The computer-implemented method includes causing, via the user interface, the first exemption certificate and the second exemption certificate to be presented to the buyer. The computer-implemented method includes electronically receiving a signature from the buyer for each of the first exemption certificate and the second exemption certificate. The computer-implemented method includes storing the signed first and second exemption certificates.

A system for generating a plurality of certificates is disclosed. The system includes one or more processors. The system includes a non-transitory computer-readable storage medium having instructions stored thereon which, when executed by the one or more processors, result in operations. The operations of the instructions include storing first item data of a first item sold by a first seller, first identity data of the first seller, second item data of a second item sold by a second seller, and second identity data of the second seller. The operations of the instructions include facilitating a buyer to form a request to buy the first item and the second item, the request to buy including the first item data and the second item data, in a transaction. The operations of the instructions include receiving, from the buyer via a user interface, an exemption request for the single transaction. The operations of the instructions include receiving buyer identity data of the buyer in connection with the exemption request. The operations of the instructions include procuring, in response to the exemption request, a first exemption certificate including at least some of the first identity data and at least some of the buyer identity data, and a second exemption certificate including at least some of the second identity data and at least some of the buyer identity data. The operations of the instructions include causing, via the user interface, the first exemption certificate and the second exemption certificate to be presented to the buyer. The operations of the instructions include electronically receiving a signature from the buyer for each of the first exemption certificate and the second exemption certificate. The operations of the instructions include storing the signed first and second exemption certificates.

A computer-implemented method is disclosed. The computer-computer implemented method includes accessing, via a client computer, a service platform that stores first item data of a first item sold by a first seller, first identity data of the first seller, second item data of a second item sold by a second seller, and second identity data of the second seller. The computer-computer implemented method includes forming a request to buy, in a single transaction, the first item and the second item in the service platform. The computer-computer implemented method includes viewing on a screen of the client computer via a user interface generated by the service platform, responsive to the request, a proposed payment for the first item, the second item, and a proposed amount of sales tax. The computer-computer implemented method includes transmitting, from the client computer, an exemption request to the service platform in connection with the single transaction. The computer-computer implemented method includes inputting buyer identity data into the service platform in connection with the exemption request. The computer-computer implemented method includes viewing, on the screen via the user interface, a first exemption certificate including at least some of the first identity data and at least some of the buyer identity data, and a second exemption certificate including at least some of the second identity data and at least some of the buyer identity data. The computer-computer implemented method includes digitally signing the first exemption certificate and the second exemption certificate. The computer-computer implemented method includes viewing, on the screen, responsive to digitally signing the first exemption certificate and the second exemption certificate, a proposed payment for the first item and the second item, without the proposed amount of sales tax.

A system for obtaining a plurality of certificates is disclosed. The system includes one or more processors. The system includes a non-transitory computer-readable storage medium having instructions stored thereon which, when executed by the one or more processors, result in operations. The operations of the instructions include accessing, via a client computer, a service platform that stores first item data of a first item sold by a first seller, first identity data of the first seller, second item data of a second item sold by a second seller, and second identity data of the second seller. The operations of the instructions include forming a request to buy, in a single transaction, the first item and the second item in the service platform. The operations of the instructions include viewing on a screen of the client computer via a user interface generated by the service platform, responsive to the request to buy, a proposed payment for the first, the second item, and a proposed amount of sales tax. The operations of the instructions include transmitting, from the client computer, an exemption request to the service platform in connection with the single transaction. The operations of the instructions include inputting buyer identity data into the service platform in connection with the exemption request. The operations of the instructions include viewing, on the screen via the user interface, a first exemption certificate including at least some of the first identity data and at least some of the buyer identity data, and a second exemption certificate including at least some of the second identity data and at least some of the buyer identity data. The operations of the instructions include digitally signing the first exemption certificate and the second exemption certificate. The operations of the instructions include viewing, on the screen, responsive to digitally signing the first exemption certificate and the second exemption certificate, a proposed payment for the first item and the second item, without the proposed amount of sales tax.

A method for a computer system to use identity data from a service platform to generate exemption certificates is disclosed. The method includes receiving, from the service platform, first identity data of a first seller of a first item, second identity data of a second seller of a second item, and buyer identity data of a buyer who is buying the first item and the second item in a single transaction. The method includes receiving, from the service platform, exemption data per which the buyer claims an exemption for the single transaction. The method includes generating a first exemption certificate including at least some of the first identity data and at least some of the buyer identity data, and a second exemption certificate including at least some of the second identity data and at least some of the buyer identity data, responsive to receiving the buyer identity data, the first identity data, second identity data, and the exemption data. The method includes outputting the first exemption certificate and the second exemption certificate to the service platform.

A system for generating a plurality of exemption certificates is disclosed. The system includes one or more processors. The system includes a non-transitory computer-readable storage medium having instructions stored thereon which, when executed by the one or more processors, result in operations. The operations of the instructions include receiving, from a service platform via a network, first identity data of a first seller of a first item, second identity data of a second seller of a second item, and buyer identity data of a buyer who is buying the first item and the second item in a single transaction. The operations of the instructions include receiving, from the service platform, exemption data per which the buyer claims an exemption for the single transaction. The operations of the instructions include generating a first exemption certificate including at least some of the first identity data and at least some of the buyer identity data, and a second exemption certificate including at least some of the second identity data and at least some of the buyer identity data, responsive to receiving the buyer identity data, the first identity data, second identity data, and the exemption data. The operations of the instructions include outputting the first exemption certificate and the second exemption certificate to the service platform.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to methods, systems, devices, and computer readable and executable programs for managing and creating exemption certificates that establish exemption status for a buyer from paying US state sales tax when purchasing from an online ecommerce retail marketplace environment where multiple sellers offer products and/or services. The methods, systems, devices and computer readable and executable programs disclosed herein may be utilized to produce multiple exemption certificates from a single transaction, where a single action initiates production of multiple exemption certificates at least some of which correspond to unique sellers.

Figure 1:
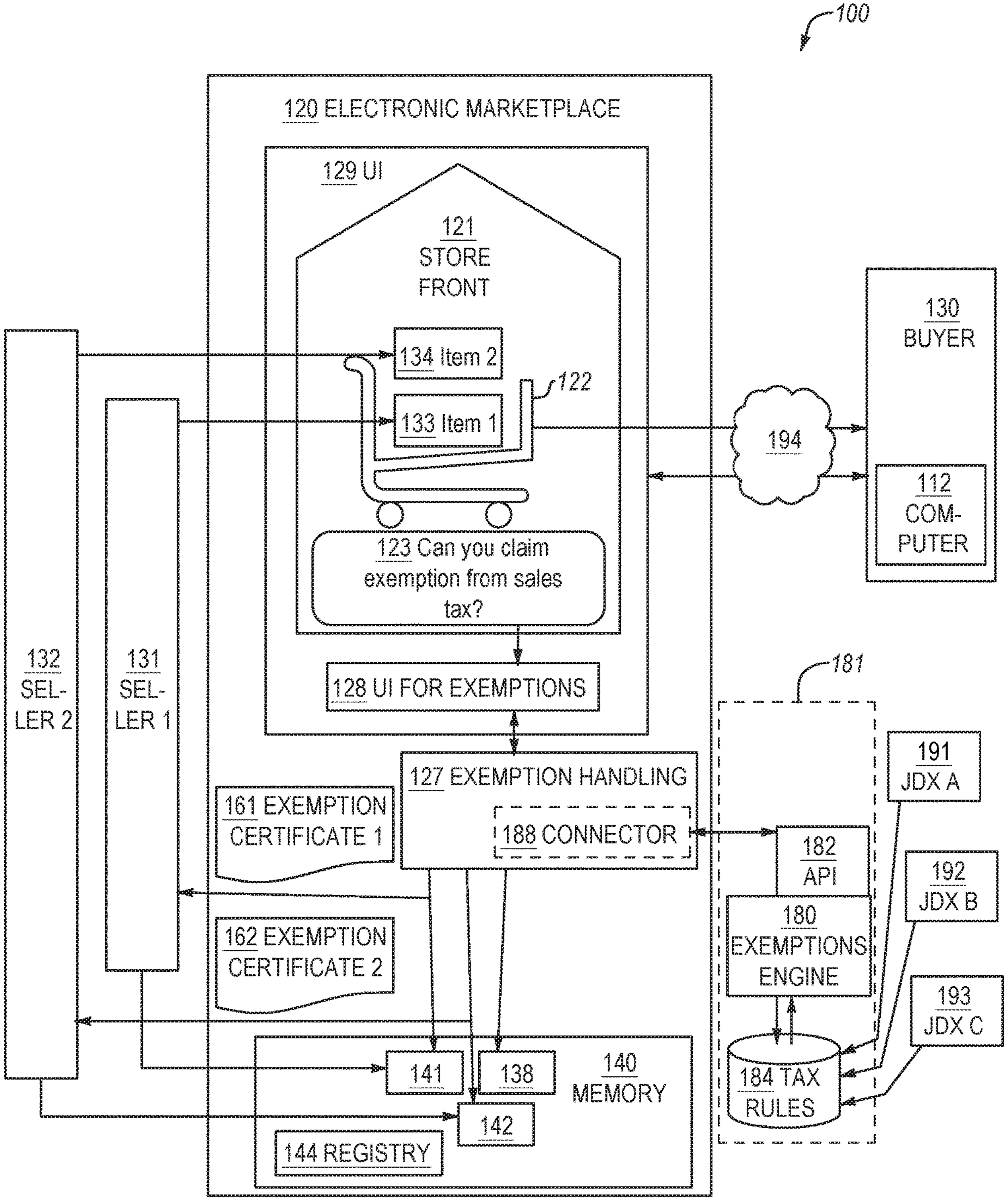
FIG. 1 shows a sample configuration according to embodiments.

FIG. 1 shows a sample configuration 100 that may generate multiple exemption certificates from a single transaction that involves items from multiple sellers. The configuration 100 includes an electronic marketplace 120, a buyer 130, a first seller 131, a second seller 132. In some embodiments the electronic marketplace 120 generates the exemption certificates by itself. In other embodiments the electronic marketplace 120 generates the exemption certificates by accessing a separate exemption platform 181. The buyer 130 may access the electronic marketplace 120 via a network 194 using a computer 112. The buyer 130, the first seller 131, the second seller 132, and the exemption platform 181 may electronically communicate with the electronic marketplace 120 via interfaces of the electronic marketplace 120. The computing devices of one or more of the sellers, the buyer 130, the electronic marketplace 120, and the exemption platform may thus form a network for purchasing items in a transaction and generating (tax) exemption certificates for multiple sellers corresponding to the transaction. Each of these devices may amount to a corresponding system, be part of a corresponding system, and so on.

The electronic marketplace 120 is a service platform for facilitating electronic transactions between sellers, such as sellers 131, 132, and buyers such as buyer 130. The electronic marketplace 120 may be a web-based (e.g., website) service platform for selling goods from a plurality of sellers to one or more buyers and for obtaining and storing tax exemption certificates relating to a transaction between a buyer and the plurality of sellers. The electronic marketplace 120 may be stored on one or more servers and may be implemented as software. The electronic marketplace 120 includes the user interface 129, an exemption handling module 127 in communication with the user interface 129, and a memory 140 in communication with the user interface 129, such as through the exemption handling module 127. The sellers 131, 132 may use private interfaces (not shown), to log in, and so on. Once logged in, the sellers 131, 132 may upload data of items they offer for sale. As such, marketplace 120 provides the first item, item 1 133, and the second item, item 2 134, for sale from, respectively, the first seller 131 and the second seller 132, as shown by arrows.

The user interface 129 displays a storefront 121 of the electronic marketplace 120. The user interface 129 may also provide a user interface for exemptions 128. The user interface for exemptions 128 may be located outside of the storefront 121, but be accessible by a screen button 123 for the buyer 130 to access and use. The buyer 130, may communicate with the electronic marketplace 120, such as via the user interface 129. For example, the buyer 130 may view the items for sale via the user interface 129.

The buyer 130 may access items (e.g., goods or services) for sale at the electronic marketplace 120 via the user interface 129 and the store front 121. Item data for the items may be stored in the electronic marketplace 120 and may be remotely viewable by the buyer 130 in the electronic marketplace 120. For example, first item, item 1 133, from the first seller 131 and second item, item 2 134, from the second seller 132 may be viewable to the buyer 130 via the storefront 121. For example, first item data corresponding to the first item, item 1 133, sold by the first seller 131 may be stored in the electronic marketplace 120. First identity data of the first seller 131 may be stored in the electronic marketplace 120. Second item data corresponding to the second item, item 2 134, sold by the second seller 132 may be stored in the electronic marketplace 120. Second identity data of the second seller 132 may be stored in the electronic marketplace 120. The first item data and the second item data may be displayed on the user interface 129 in the storefront 121. For example, the first item, item 1 133, and the second item, item 2 134, may be selected for purchase, by the buyer 130, such as placing the first item, item 1 133, and the second item, item 2 134, into a cart 122 in the (electronic) storefront 121. It should be appreciated that the number of goods and the number of sellers is not limited. For example, any number of goods corresponding to any number of sellers may be stored in the electronic marketplace 120 and may be offered for sale.

The buyer 130 places at least two items in the cart 122, such as the first item, item 1 133, and the second item, item 2 134. The cart 122 represents and facilitates a request to buy all items therein in a single transaction. Upon purchase, the sellers are required, in many jurisdictions, to retain certain information of the transaction for remitting sales tax to the jurisdictions. However, if the buyer 130 claims tax exempt status, the sellers are also required to obtain and retain proof that the items they sold in the transaction were subject to a tax exemption on the part of the buyer 130.

The user interface 129 provides an option for requesting and obtaining a plurality of tax exemption certificates from the single transaction. For example, the user interface 129 may display an exemption request selection option, such as a prompt which states queries whether the buyer 130 can claim an exemption. The exemption request may direct the buyer 130 to the user interface for exemptions 128 in the user interface 129.

The user interface for exemptions 128 may be utilized to obtain exemption certificates from the exemption platform 181. For example, the user interface for exemptions 128 may be used to submit the exemption request for the transaction. The user interface for exemptions 128 may be located outside of the storefront 121, such as in a pop-up, web-page, or window for obtaining tax exemption certificates within the user interface 129 of the electronic marketplace 120. The user interface for exemptions 128 may be operably coupled to an exemption handling module 127 within the electronic marketplace 120. In some embodiments, the exemption handling module 127 includes a connector 188 which is operably coupled to the user interface for exemptions 128, the exemption platform 181, and the memory 140 of the electronic marketplace 120. The connector 188 may include one or more of hardware, software, firmware configured to communicate with the exemption platform 181 and other functionalities of the electronic marketplace 120. For example, the connector 188 may communicate with a remote device (e.g., server) storing and executing the exemption platform 181 to relay the certificate request thereto, such as responsive to the exemption request. The certificate request may be exemption request transmitted from the exemption handling module 127 to the exemption platform 181. The single exemption request may be transmitted to the exemption platform 181 as a single certificate request for multiple sellers in the transaction or a plurality of certificate requests each for a respective seller in the transaction.

The exemption platform 181 may include an application programming interface (API) 182, an exemption engine 180, and a tax rules database 184. The exemption platform 181 may receive and store jurisdiction-specific tax rules from various jurisdictions, such as exemption rules specifying qualifications for tax exempt status in various jurisdictions (e.g., countries, states, provinces, territories). For example, exemption rules 191 from Jurisdiction A, exemption rules 192 from Jurisdiction B, and exemption rules 193 from Jurisdiction C may be imported into the exemption platform 181 and stored in the tax rules database 184, either directly or manually upon research. Upon receiving the certificate request corresponding to the exemption request, the exemption engine 180 may query the tax rules database 184 for the data required to qualify for a tax exemption in the jurisdictions. In turn, the data required to qualify for a tax exemption may be presented for specific information such as buyer identity data (e.g., place of residence, business type, name, etc.) or seller data. The exemption platform 181 may store fillable forms, such as blank exemption certificates corresponding to specific combinations of selected jurisdiction(s) and exemption rationale(s). The fillable forms may be associated with the corresponding exemption rules for a selected jurisdiction according to a specific exemption rationale. Accordingly, the exemption engine 180 may locate and identify the data required to qualify for an exemption in a selected jurisdiction. The exemption engine 180 may communicate the data required to qualify for the exemptions to the exemption handling module 127. The exemption handling module 127 may communicate the data required to qualify for the exemptions to the user interface for exemptions 128. The data required to qualify for the exemptions may be communicated to the user on the user interface for exemptions 128 as fillable fields thereon. For example, the user interface for exemptions 128 may display one or more queries for data which the exemption handling module 127 and exemption engine 180 requires for competing (tax) exemption certificates for the transaction. The buyer identity data of the buyer 130 may be received via the user interface for exemptions 128, in connection with the exemption request.

Figure 2:
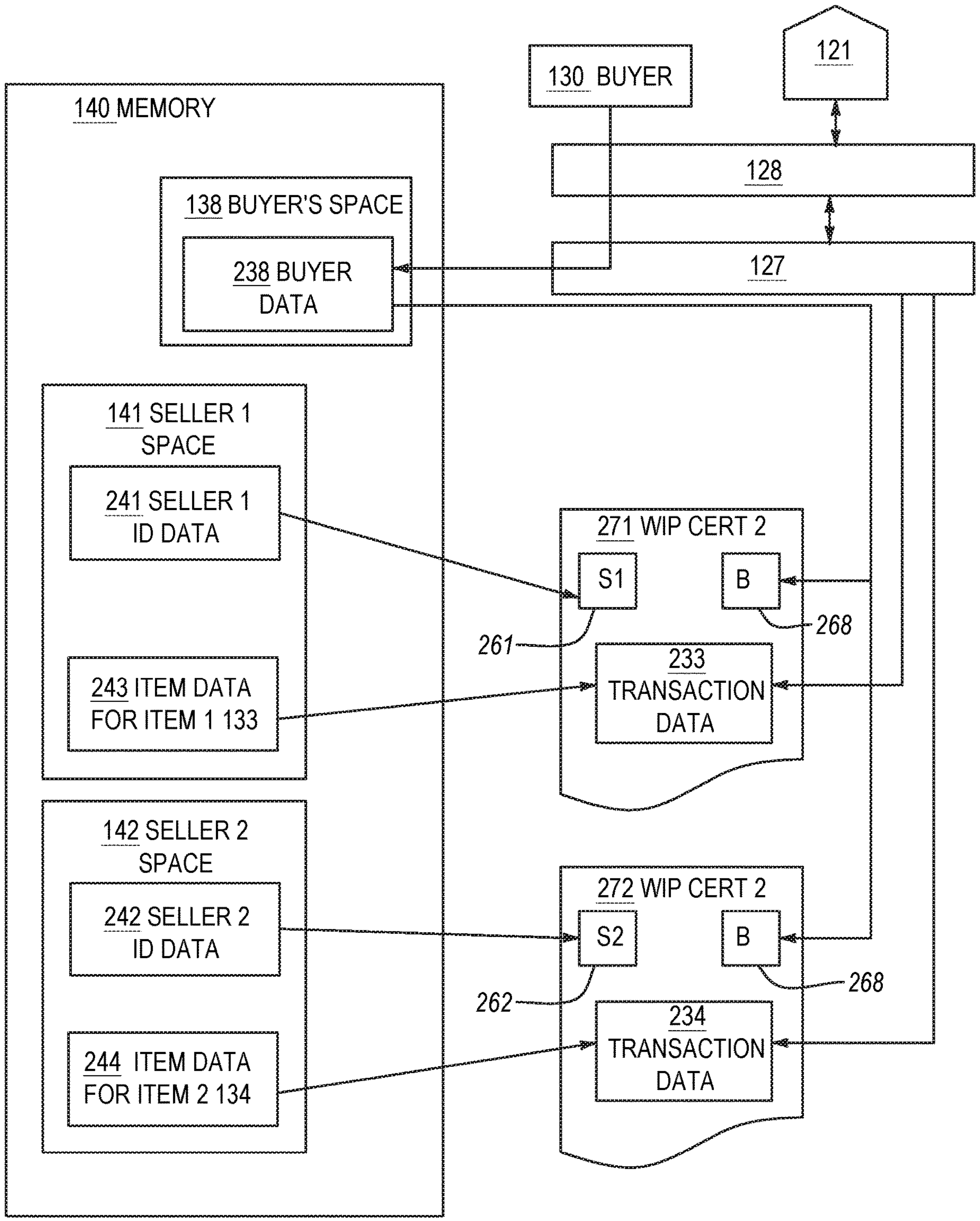
FIG. 2 shows a sample detail of the configuration of FIG. 1, according to embodiments.

In some embodiments, one or more pieces of buyer identity data, seller identity data, or transaction data may be provided to the exemption engine 180 via the exemption handling module 127 and user interface for exemption handling 128, such as prior to, contemporaneously with, or after requesting an exemption (e.g., submitting the certificate request). Responsive thereto, the exemption engine 180 may query the tax rules database 184 and output a plurality of exemption certificates that are still work in progress (WIP). Such WIP exemption certificates may have one or more empty fields corresponding to at least some of the data required to qualify for the exemptions. In such embodiments, one or more of the exemption engine 180 or exemption handling module 127 may fill at least some of the fields in the exemption certificates with the one or more of buyer identity data, seller identity data, or transaction data. For example, the exemption handling module 127 may query the memory 140 to retrieve one or more of first seller identity data 241 (seen in FIG. 2), second seller identity data 242, or buyer data 238 stored therein. The first seller identity data 241, and the second seller identity data 242 may be input into and stored in the memory 140 prior to the transaction, in connection with preparing the items for sale. Also shown in FIG. 2 is how data from buyer 130 may be captured at this stage and stored as buyer data 238 in buyer's space 138. The buyer's space 138 may be part of a registry 144 within the memory 140. The registry 144 may be referenced when a buyer accesses the electronic marketplace 120. For example, upon logging-in or participating in a transaction (e.g., buying or selling goods in the transaction), the electronic marketplace 120 may match sign-on credentials or other information with corresponding identity data in the registry 144. The registry 144 may include a list of users and their associated identity data. In some embodiments, the identity data may be stored in the individual user spaces within the memory as disclosed in more detail herein.

One or more of the exemption handling module 127, the user interface for exemptions 128, or the exemption platform 181 may be used to procure exemption certificates corresponding to the transaction, based on a single exemption request. For example, one or more of the exemption handling module 127, the user interface for exemptions 128, or the exemption platform 181 may be used to procure multiple exemption certificates in response to the (single) exemption request. The multiple exemption certificates may include a first exemption certificate including at least some of the first identity data of the first seller 131 and at least some of the buyer identity data, and a second exemption certificate including at least some of the second identity data of the second seller 132 and at least some of the buyer identity data. The multiple exemption certificates may also include at least a third exemption certificate including at least some third identity data of at least a third seller and at least some of the buyer identity data. Accordingly, a single exemption request (and/or certificate request) may be utilized to obtain multiple exemption certificates corresponding to multiple sellers in the transaction.

Transaction data, such as first item data, second item data, purchase price(s), date of purchase, or the like may also be included in the exemption certificates. The exemption certificates may be relayed to the exemption handling module 127 from the exemption platform 181 via the connector 188. The exemption handling module 127 may relay the exemption certificates to one or more of the user interface for exemptions 128, the first seller 131, the second seller 132, or the memory 140. For example, the first exemption certificate and the second exemption certificate may be relayed to the user interface for exemptions 128 and presented (e.g., displayed in the UI) to the buyer 130.

As noted above, data may be retrieved from the memory 140 to complete the exemption certificates. The data related to the transaction, the sellers, and the buyer may be stored in the memory 140 and may be retrieved therefrom to at least partially complete the exemption certificates.

FIG. 2 is a sample detail of configuration 100, according to embodiments. The buyer 130 may provide buyer data 238, such as buyer identity data to the memory 140 via the user interface for exemptions 128 and the exemption handling module 127. The exemption handling module 127 may communicate with the memory 140, such as to input the buyer data 238 therein or to access the buyer data 238. The memory 140 may include a buyer's space 138 therein to store data associated with the buyer 130 (e.g., buyer identity data, transaction data from buyer transactions, certificates from past transactions). The exemption handling module 127 may query the memory 140 to retrieve one or portions of the buyer data 238 therefrom.

The exemption certificates may be obtained from the exemption platform 181 in an at least partially uncompleted form. For example, the first work in process (WIP) certificate 271 and the second WIP certificate 272 may be obtained from the exemption platform 181 by the exemption handling module 127. One or more portions (e.g., fields) of the first WIP certificate 271 and the second WIP certificate 272 may be filled by the exemption handling module 127 with data from the memory 140. For example, the exemption handling module 127 may query the memory 140 for the seller identity data, the buyer identity data, the transaction data, or the like. As shown, the storefront 121 may communicate with the user interface for exemptions 128, such as to provide first item data, second item data, or other transaction data thereto. The user interface for exemptions 128 communicates with the exemption handling module 127. For example, the user interface for exemptions 128 may provide the transaction data to the exemption handling module 127. The exemption handling module 127 may communicate the data (e.g., transaction data, seller identity data, buyer identity data) to the memory 140 and insert at least some of said data into the first WIP certificate 271 and the second WIP certificate 272.

The store front 121 may communicate the transaction data to the memory 140 and provide said transaction data to the first WIP certificate 271 and the second WIP certificate 272 via the user interface for exemptions 128 and the exemption handling module 127. For example, first item data 243 (e.g., category, name, amount, price) corresponding to the first item, item 1 133, may be provided to the memory 140 by the exemption handling module 127 such as via the user interface for exemption 128. The first item data 243 may be stored in a first seller space 141 within the memory 140. The first seller space 141 may store the first seller identity data 241 (e.g., name, tax identification number, location, organization type, etc.) and first item data 243 therein. Second item data 244 (e.g., category, name, amount, price) corresponding to the second item, item 2 134, may be provided to the memory 140 by the exemption handling module 127 such as via the user interface for exemption 128. The second item data 244 may be stored in a second seller space 142 within the memory 140. The second seller space 142 may store the second seller identity data 242 (e.g., name, tax identification number, location, organization type, etc.) and second item data 244 therein. Additional seller spaces may store additional seller identity data and additional item data from any number of additional items and sellers involved in the transaction, such as for at least one additional seller.

The exemption handling module 127 may fill or direct the filling of one or more fields of the WIP certificates, such as with data from one or more of the memory 140 or the storefront 121 (e.g., via the user interface for exemptions 128).

The exemption handling module 127 may fill or direct the filling of seller identity fields of WIP certificates with seller identity data, such as seller identity data from one or more of the memory 140 or the storefront 121. For example, the exemption handling module 127 may fill a first seller field 261 in the first WIP certificate 271 with the first seller identity data 241 or a portion thereof and may fill a second seller field 262 of the second WIP certificate 272 with the second seller identity data 242 or a portion thereof. Seller fields in any number of WIP certificates may be filled or directed to be filled by the exemption handling module 127. For example, the exemption handling module 127 may fill or direct filling of additional seller identity fields of additional WIP certificates with additional seller identity data from the memory 140 or the storefront 121.

The exemption handling module 127 may fill or direct the filling of buyer identity fields of WIP certificates with buyer identity data, such as buyer (identity) data 238 from one or more of the memory 140 or the storefront 121. For example, the exemption handling module 127 may access the buyer data 238 and provide said buyer data 238 or a portion thereof to the buyer fields 268 of the WIP certificates, such as the first WIP certificate 271 and the second WIP certificate 272. Buyer fields in any number of WIP certificates may be filled or directed to be filled by the exemption handling module 127. For example, the exemption handling module 127 may fill or direct filling of buyer identity fields of additional WIP certificates with buyer identity data from the memory 140 or the storefront 121.

The exemption handling module 127 may fill or direct the filling of transaction data fields of WIP certificates with transaction data, such as transaction data from one or more of the memory 140 or the storefront 121. For example, the exemption handling module 127 may fill or direct the filling of a first transaction data field 233 in the first WIP certificate 271 such as with at least a portion of the first item data 243 for the first item, item 1 133, and one or more portions of the transaction data (e.g., date of sale, purchase amount) from the storefront 121 (via the user interface for exemptions 128 and the exemption handling module 127). The exemption handling module 127 may fill or direct the filling of the first transaction data field 233 with the at least a portion of the first item data 243 and at least a portion of the transaction data. The exemption handling module 127 may fill or direct the filling of a second transaction data field 234 in the second WIP certificate 272 such as with at least a portion of the second item data 244 for the second item, item 2 134, and one or more portions of the transaction data (e.g., date of sale, purchase amount) from the storefront 121. The exemption handling module 127 may fill or direct the filling of the second transaction data field 234 with the at least a portion of the second item data 244 and at least a portion of the transaction data. The exemption handling module 127 may fill or direct the filling of additional transaction data fields of additional WIP certificates with at least a portion of additional item data and at least a portion of the transaction data.

In some embodiments, the transaction data may be saved in the memory 140 and may be provided to the WIP certificates from the memory 140, such as by the exemption handling module 127. The exemption handling module 127 may be implemented as software. In such embodiments, the exemption handling module 127 may include machine readable and executable instructions stored on a non-transitory computer readable storage medium and may be executed by one or more processors. In some embodiments, the exemption handling module 127 may be a component or module of the larger electronic marketplace 120 service platform.

Returning to FIG. 1, the as-yet unfinished exemption certificates, such as the first WIP certificate 271 and the second WIP certificate 272, and may be presented to the buyer 130, such as via the user interface for exemptions 128. The user interface for exemptions 128 may be used to request and receive a buyer signature for the as-yet unfinished exemption certificates (e.g., WIP certificates). For example, the exemption handling module 127 may form or receive the WIP certificates, such as the first WIP certificate 271 and the second WIP certificate 272, and may provide a prompt and field in the user interface for exemptions 128 to receive an electronic signature for the WIP certificates to form signed exemption certificates. An example is now described.

Figure 3:
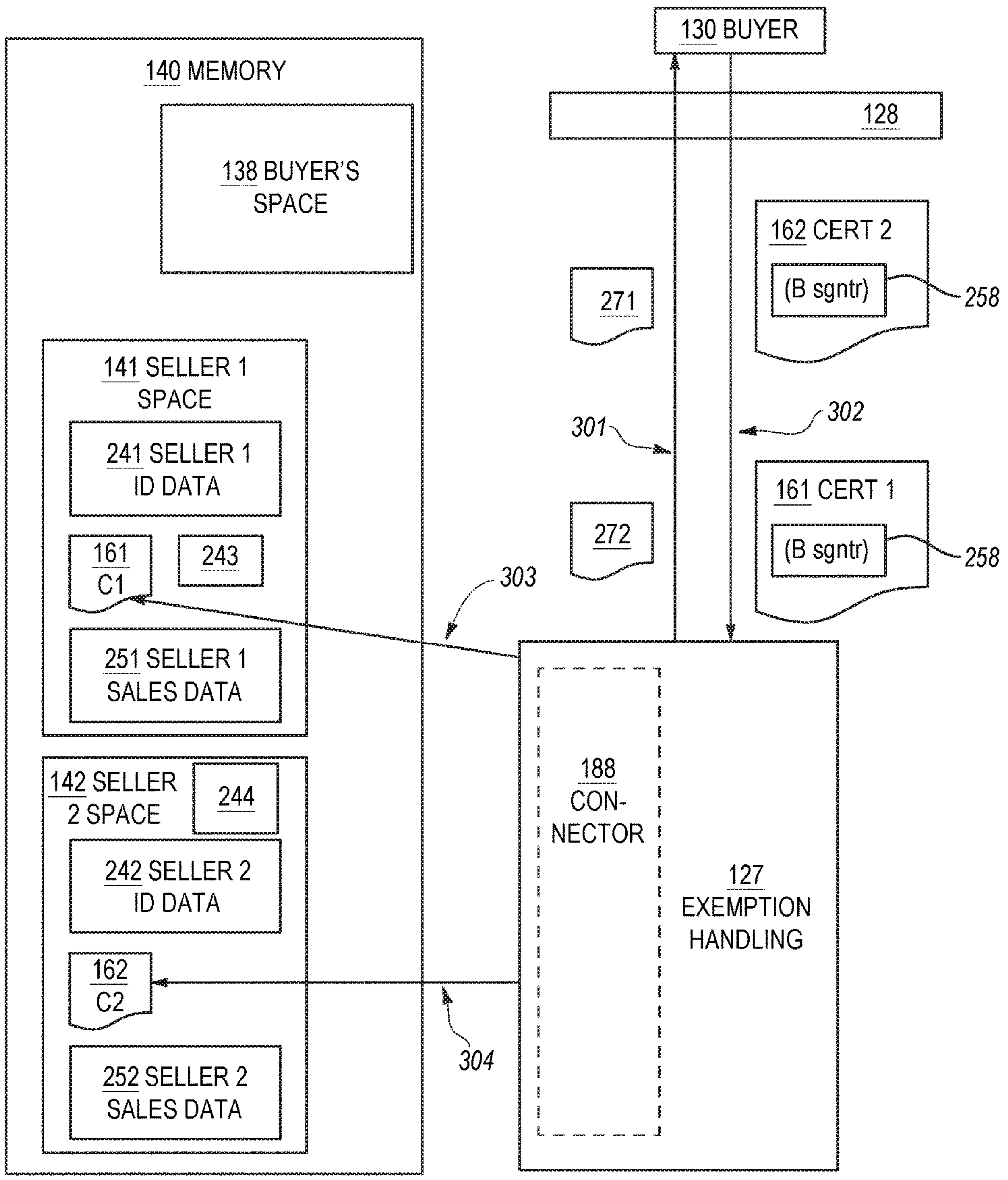
FIG. 3 shows a sample configuration, according to embodiments.

FIG. 3 is a sample detail of configuration 100, according to embodiments. The user interface for exemptions 128 may present a field for authorization by the buyer 130. The user interface for exemptions 128 may present the as-yet unfinished exemption certificates (WIP certificates), such as for authorization (e.g., signature), to the buyer 130. For example, as shown at arrow 301, the exemption handling module 127 may direct user interface for exemptions 128 to display the first WIP certificate 271 and the second WIP certificate 272with one or more of the fields therein filled, such as shown in FIG. 2. In such embodiments, the WIP certificates may display the data or information required to qualify for the exemption in a selected jurisdiction. For example, one or more of the first item data, the second item data, the first seller identity data, the second seller identity data, the buyer identity data, transaction data, jurisdiction, or rationale for claiming the exemption may be presented on or with the WIP certificates. Responsive thereto, the buyer 130 may electronically sign the WIP certificates. Such electronic signature may be provided separately for each WIP certificate or may be provided as a single electronic signature applied to all WIP certificates of the transaction. An example is now described.

Figure 4:
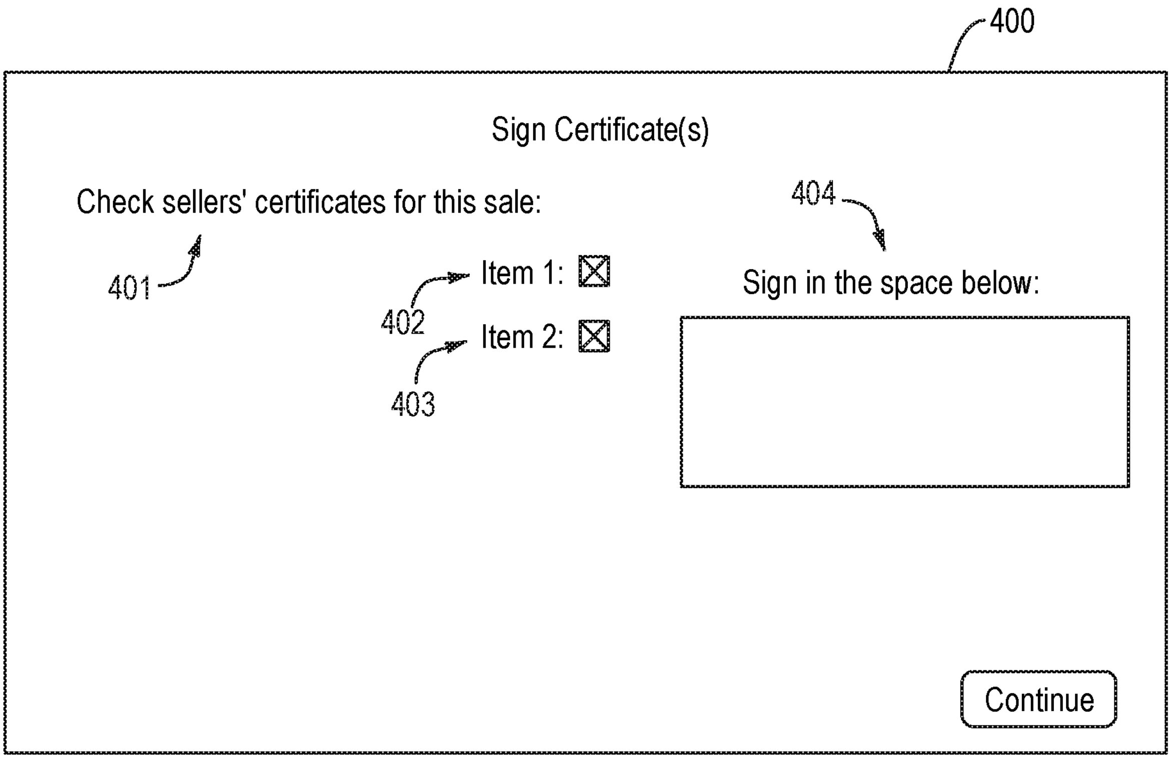
FIG. 4 shows a user interface for receiving an electronic signature, according to embodiments.

FIG. 4 is a user interface 400 for receiving an electronic signature, according to an embodiment. As shown the user interface 400 includes a field 404 for inputting or receiving an electronic signature. The electronic signature may be provided as a drawn signature (e.g., in pdf format), a typed signature, or the like.

The user interface 400 also may include an indication of the exemption certificates to which the electronic signature may be applied. For example, the user interface 400 may include a checklist of items or goods corresponding to exemption certificates against which the electronic signature may be applied. For example, the prompt 401 may state "check seller's certificates for this sale" or the like. The user interface 400 may include a first check box 402 for the first item and a second checkbox 403 for second item to select which items (and associated WIP certificates) the signature will be applied to. In such embodiments, the first and second checkboxes 401 and 402 may be preselected (e.g., automatically set to select all items/sellers) or may be open (e.g., automatically set to require buyer to affirmatively opt each item in) upon presentation to the buyer. The items in the checklist may be toggled on or off to apply the electronic signature thereto. For example, the buyer 130 may elect to omit the electronic signature from one or more WIP certificates. The user interface 400 may also have an option to select or deselect all WIP certificates for the transaction on which to apply the electronic signature. The user interface 400 may include a selection for continuing in the process of generating the exemption certificates after providing the electronic signature and optionally selecting the WIP certificates on which to apply the electronic signature.

Returning to FIG. 3, the signature 258 received in (e.g., entered into) the user interface 400 may be applied to WIP certificates 271 and 272 to form the signed exemption certificates, such as a first signed exemption certificate 161 and a second signed exemption certificate 162. Aside from the electronic signature, the first signed exemption certificate 161 may display the first seller identity data, the first item data, the transaction data, the buyer identity data, jurisdictional data, exemption rationale, or portions thereof. Aside from the electronic signature, the second signed exemption certificate 162 may display the second seller identity data, the second item data, the transaction data, the buyer identity data, jurisdictional data, exemption rationale, or portions thereof. One or more additional signed exemption certificates may display the electronic signature, additional seller identity data, additional item data, the transaction data, the buyer identity data, jurisdictional data, exemption rationale, or portions thereof. The signed exemption certificates may be retained and used for tax collection and recordation purposes.

The first signed exemption certificate 161 and the second signed exemption certificate 162 may be relayed to the exemption handling module 127 as shown at arrow 302. The signed exemption certificates (e.g., first signed exemption certificate 161 and second signed exemption certificate 162) may be displayed on the user interface for exemptions 128, may be stored in the memory 140, or may be relayed to the first seller 131 or the second seller 132, or the buyer 130, respectively. For example, the signed exemption certificates may be stored in the memory 140. The first exemption certificate 161 may be relayed to and stored in the memory 140, such as to the first seller space 141, by the exemption handling module 127 as shown at arrow 303. The second exemption certificate 162 may be relayed to and stored in the memory 140, such as to the second seller space 142, by the exemption handling module 127 as shown at arrow 304. The signed exemption certificates 161 and 162 may be relayed to the memory from the exemption handling module 127, such as via the optional connector 188. While shown as only two exemption certificates, additional exemption certificates may be made responsive to a single command according to the example techniques disclosed herein. Additional exemption certificates may be relayed to and stored in the memory 140, such as to corresponding additional seller spaces in the memory 140, by the exemption handling module 127. The signed exemption certificates 161 and 162 may be later accessed and output from the memory 140, such as upon request by the seller(s).

As shown, seller sales data may be stored in the seller spaces in the memory 140. The seller sales data may include transaction data from sales for which exemption certificates have been produced. For example, the first seller sales data 251 may be stored in the first seller space 141 along with the first item data 243 and the first signed exemption certificate 161. The second seller sales data 252 may be stored in the second seller space 142 along with the second item data 244 and the second signed exemption certificate 162.

Returning to FIG. 1, the signed exemption certificates or data therein (e.g., first seller identity data, second seller identity data, buyer identity data, transaction data) may be stored in the registry 144 of the memory 140. The signed exemption certificates or the data therein may be retrievable by the exemption handling module 127, the user interface for exemptions 128, or the user interface 129.

The sellers may store the signed exemption certificates, and show them to the applicable tax jurisdictions if they are audited. One or more portions of the configuration 100 may be implemented as software, hardware, or firmware. The configuration 100 also provides an overview of portions of methods for making, requesting, or receiving multiple exemption certificates from a single transaction. Examples of specific portions of the configuration 100 and methods performed therewith are described in more detail below.

In use, the buyer 130 initiates the transaction by forming an order, such as by adding items to the cart 122 in the storefront 121. In conjunction with the order, the buyer 130 also initiates the production of the exemption certificates, so as to receive an exemption from paying sales taxes for the items, by submitting an exemption request in the storefront 121 of the electronic marketplace 120.

Figure 5:
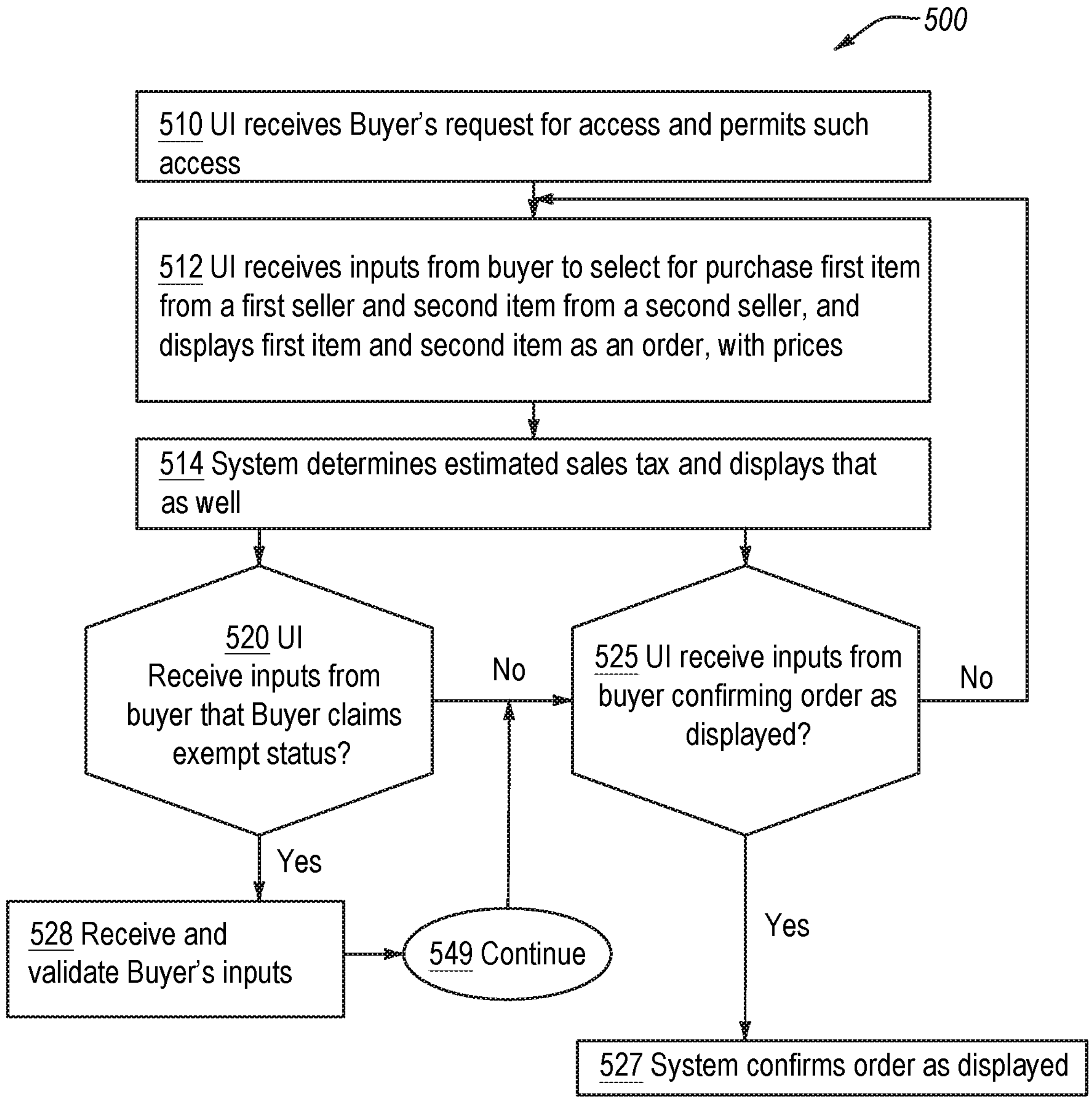
FIG. 5 shows a sample configuration of an algorithm for forming an order, according to embodiments.

FIG. 5 is a sample configuration of an algorithm 500 for forming an order, according to an embodiment. At block 510, a user interface receives a buyer's request for access and permits the access. For example, the request for access may be a log-in request to an electronic marketplace or storefront. At block 512, the user interface receives inputs from the buyer to select (at least) for purchase the first item from the first seller and the second item from the second seller, and displays the first item and second item as an order, with their prices. Additional items from the first and second sellers or additional sellers may be selected and displayed in the order. At block 514, the algorithm 500 determines estimated sales tax (based on the order) and displays the estimated sales tax. At block 520, the user interface receives inputs from the buyer for claiming exempt status (e.g., exemption request). If the buyer claims exempt status, the algorithm 500 proceeds to block 528 to receive and validate the buyer inputs. The buyer inputs may include identification of the buyer, buyer's title, the buyer's contact information (e.g., e-mail address, physical address, phone number), the buyer's organization, buyer's organization location (e.g., place of incorporation, headquarters), the buyer's organization contact information, indication of the signer of the exemption certificates, title of the signer, contact information of the signer, the rationale upon which the buyer claims the exemption, and one or more jurisdiction selections (e.g., jurisdictions in which the buyer claims the exemption). The buyer inputs may include the electronic signature for the exemption certificates. The buyer inputs may be utilized to form signed exemption certificates.

The buyer's input may include inputs to form WIP certificates and sign the WIP certificates to produce the signed exemption certificates as disclosed herein. In some embodiments, portions of one or more buyer inputs are retrieved from elements of the system (e.g., memory 140 or exemption handling module 127 of FIG. 1). In such embodiments, if elements of the system store any portion of the buyer inputs, these buyer inputs may be used for forming the exemption certificates, such as by auto-populating one or more data fields with the portion of the buyer inputs.

This description will return to blocks 520 and 528 of FIG. 5. For further illustrating block 528, an example is now described.

Figure 6:
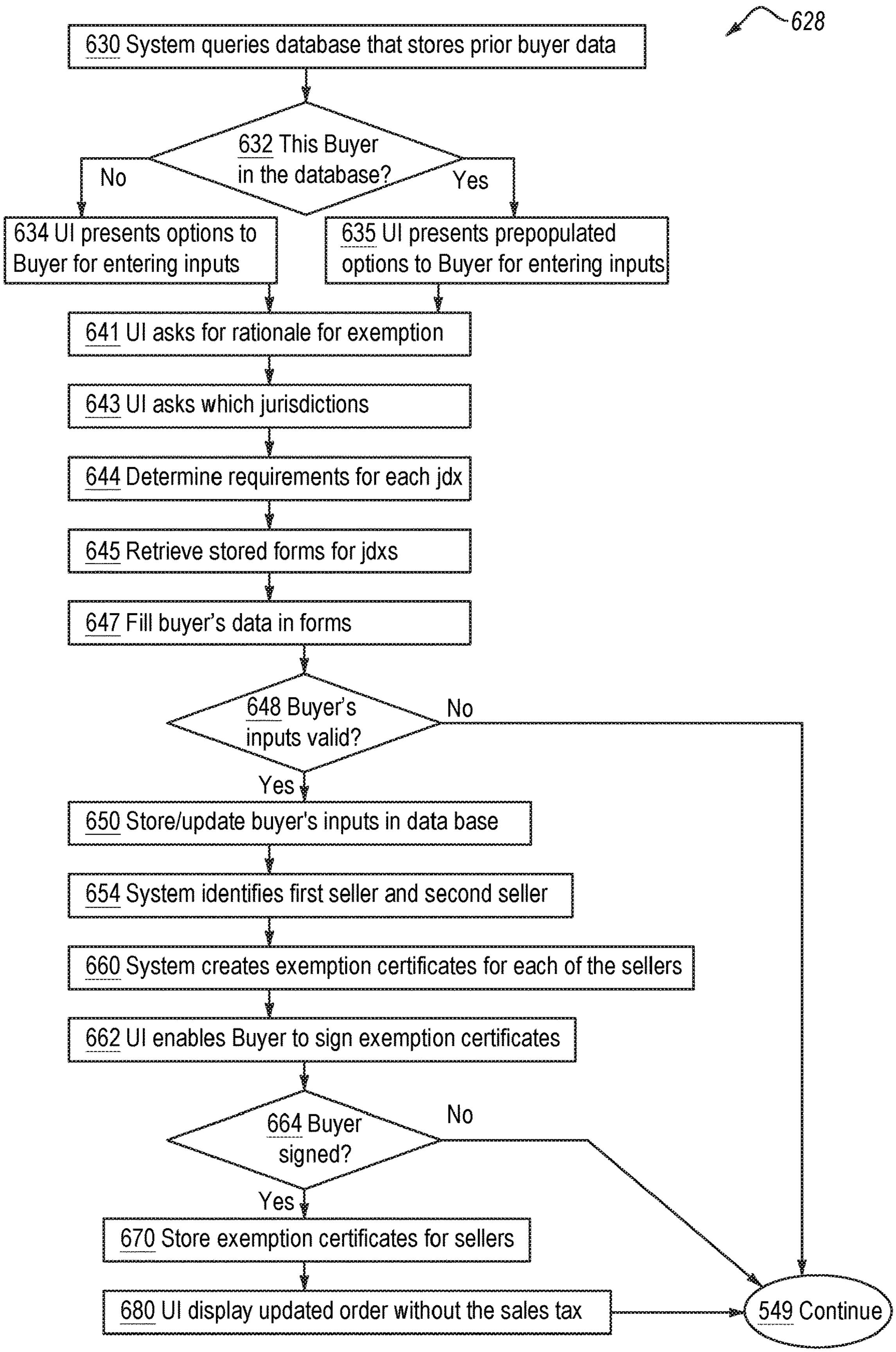
FIG. 6 shows a sample algorithm for providing buyer inputs, according to embodiments of a block of FIG. 5.

FIG. 6 is an algorithm 628 for providing buyer inputs, according to embodiments of block 528. The algorithm 628 includes block 630 wherein a database is queried for presence of the buyer data there, such as buyer identity data. Elements of the system that may be queried include the memory 140, the user interface 129, or the exemption handling module 127. At block 632, the algorithm 628 determines, from the result of the querying of block 630, whether or not the buyer is already in the database. If not, the algorithm 628 proceeds to block 634 where the user interface presents options to the buyer for entering inputs, such as in one or more fields of a form. If at block 632 the answer is yes, the algorithm 628 proceeds to block 635 where the user interface presents pre-populated options for the buyer inputs in one or more fields.

Each of blocks 634, 635 may use a user interface, such as a graphical user interface. In fact, in some embodiments the interface may be the same, with some of the fields prepopulated for block 635 but not for block 634. Before returning to FIG. 6, an example of such an interface is now described.

Figure 7:
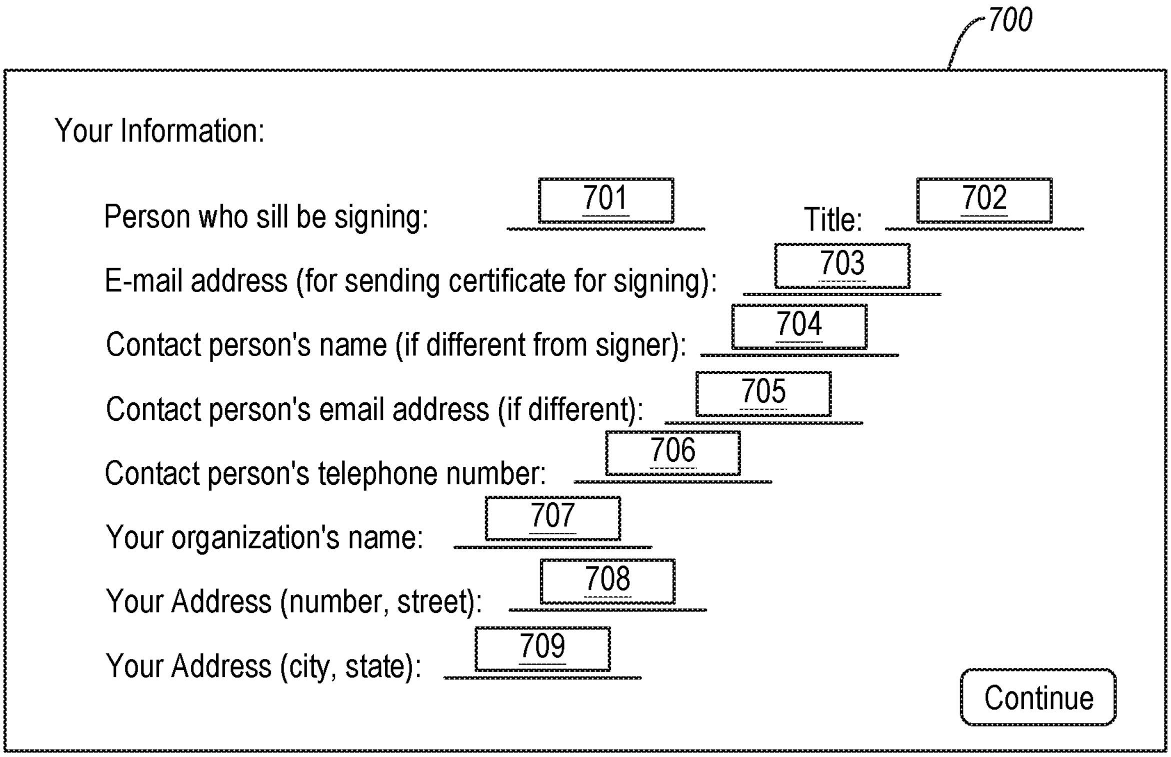
FIG. 7 shows a user interface for receiving buyer inputs, according to embodiments.

FIG. 7 is a user interface 700 for receiving buyer inputs, according to embodiments. As shown, the user interface 700 may include an electronically fillable form for buyer information (e.g., buyer identity data). The user interface 700 may include a field 701 for stating the identity of the person who will sign the exemption certificates (e.g., WIP certificates) and a field 702 for identifying the title of the person who will sign. The user interface 700 may include a field 703 for providing the e-mail address of the person who will sign the exemption certificates.

Some embodiments allow for adding a contact person who is different from the person who will be signing. In such embodiments, the user interface 700 may include a field 704 for providing the contact person's name, a field 705 for providing the contact person's e-mail address, and a field 706 for providing the contact person's telephone number. For example, an accountant may be identified as the person who will sign in field 701, but the contact person in field 704 may be identified as an administrator, owner, or supply chain supervisor.

The user interface 700 may further include a field 707 for identifying the organization which the buyer represents (e.g., individual, company, charity, etc.), a field 708 for the signer's address (e.g., street address), and at least one additional field 709 for the signer's address (e.g., state, city, zip code). In some embodiments, additional fields may be present in the user interface 700, such as fields for the address of the organization.

The user interface 700 may include a selection for continuing in the process of generating the exemption certificates after providing the buyer information.

At block 634 of FIG. 6, the user interface presents options to the buyer for entering buyer inputs, such as in one or more empty fields of an electronically fillable form. Each empty field may be associated with a prompt indicating the information required in the empty field, such as those described above with respect to FIG. 7. The buyer may provide buyer inputs into any of the fields 701-709, by entering the buyer data or information into the respective fields. For example, the buyer may type the buyer input in the respective fields using a keyboard, mouse, or other input device(s) at a computing device of the buyer displaying the user interface 700.

At block 635 of FIG. 6, the user interface 700 may present pre-populated options for the buyer inputs in one or more electronically fillable fields. For example, one or more of the fields of the form presented in user interface 700 may be populated with previous buyer inputs retrieved from the memory 140, such as from a buyer space is in the memory 140. In some embodiments, one or more buyer inputs such person who will be signing, email address for person who will be signing, contact person, contact persons contact information, or the like may be retrieved from previously generated exemption certificates or fillable data fields for the buyer inputs stored in the memory 140. Such fillable data fields may be filled in the memory upon initial entry of the buyer inputs in a first exemption certificate or by a separate registration prior to requesting or obtaining an exemption certificate. In such embodiments, all of the fields 701-709 may be pre-populated and presented to the buyer via the user interface 700. The user interface 700 may allow the buyer to update, change, or accept the buyer inputs pre-populated in any of the fields 701-709. For example, the buyer may change the person who will be signing on the user interface 700 from the pre-populated person who will be signing retrieved from the memory. In some embodiments, only some of the fields 701-709 may be pre-populated. In such embodiments, the empty fields may be filled with buyer input by the buyer after presentation of the user interface 700 with only some of the fields 701-709 pre-populated.

When all buyer inputs have been confirmed, edited, or added by the buyer to the user interface 700, the buyer may elect (e.g., click on) a continuation selection, such as a continue button as shown in FIG. 7.

Returning to FIG. 6, upon providing at least some of the buyer inputs in block 634 or block 635, the algorithm 628 proceeds to block 641 wherein the user interface queries the user for an exemption rationale. This can be performed in a number of ways, such as with a user interface. An example is now described.

Figure 8:
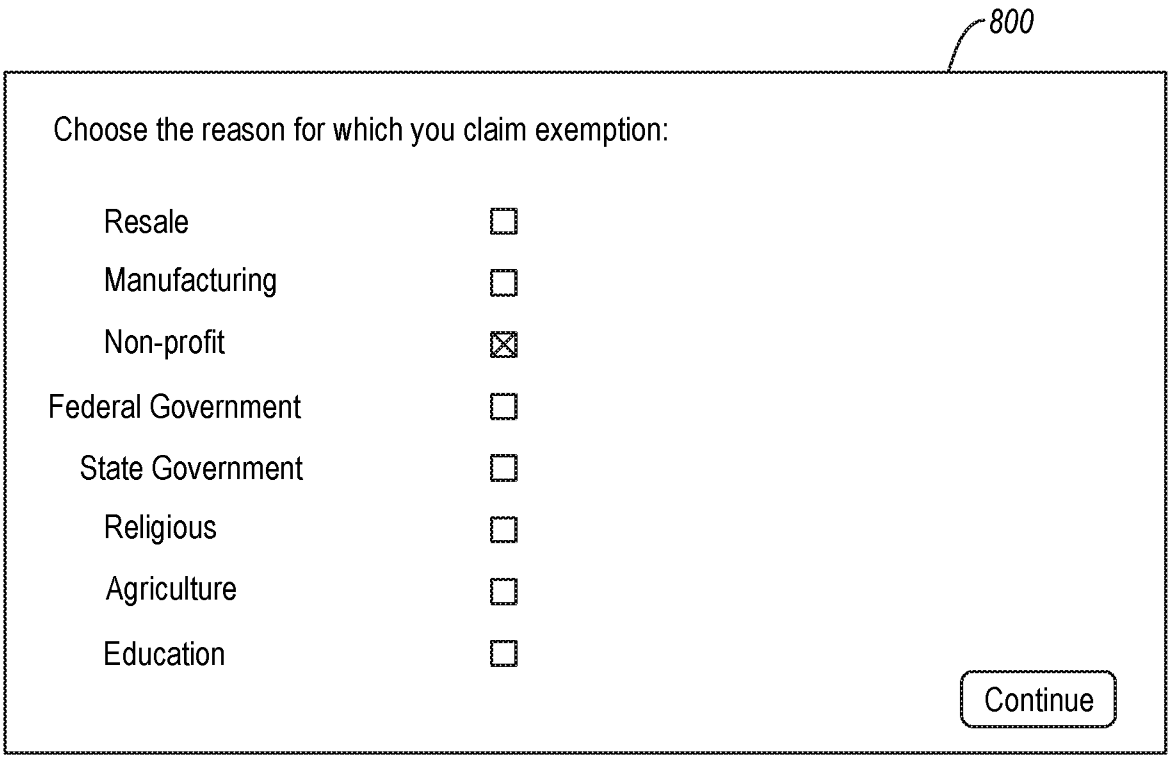
FIG. 8 shows a user interface for receiving buyer inputs, according to embodiments.

FIG. 8 is a user interface 800 for receiving buyer inputs, according to embodiments. The user interface 800 may include a plurality of fillable fields for indicating the exemption rationale(s)—rationale(s) the buyer believes qualifies them for an exemption. For example, the plurality of fillable fields may include one or more rationales each having a selection box associated therewith, such as a checkbox that toggles between select and un-select options for the rationale associated therewith. In embodiments, the exemption rationales may include indication that the items are for resale, an indication the items are for manufacturing, indication that the buyer claims non-profit status, indication that the buyer entered the transaction on behalf of a governmental entity (e.g., federal, state, or local government), indication that the buyer entered the transaction on behalf of a religious organization, an indication that the buyer entered into the transaction for agricultural use, an indication that the buyer entered into the transaction on behalf of an educational entity or for educational use, or any other rationale for claiming an exemption. Although not shown in the example of FIG. 8, in some embodiments, the list of exemption rationales may include an "other" option, which when selected provides a fillable box that accepts typed inputs to provide a custom exemption rationale that is not specifically enumerated in the exemption rationales in the list. The user interface 800 may be displayed to the buyer via the user interface for exemptions 128 (FIG. 1).

Returning to FIG. 6, upon inputting the one or more rationales, such as by checking the selection box associated with respective rationales, the algorithm proceeds to the block 643 where the user interface queries the buyer for the jurisdiction(s) in which the buyer claims the exemption(s). The buyer may select one or more jurisdictions in which the buyer claims the exemption. This can be performed in a number of ways, such as with a user interface. An example is now described.

Figure 9:
FIG. 9 shows a user interface for receiving buyer inputs, according to embodiments.

FIG. 9 is a user interface 900 for receiving buyer inputs, according to embodiments. The user interface 900 may include a plurality of fillable fields for indicating the jurisdiction(s) in which the buyer claims an exemption. For example, the plurality of fillable fields may include jurisdictions each having a selection box associated therewith, such as a checkbox that toggles between select and un-select options for the jurisdiction associated therewith. In embodiments, the jurisdictions may include countries, states, territories, counties, cities, municipalities, or the like. As shown, the user interface 900 may include a list of all of the states in the United States of America with a selection box associated with each state in the list. The user interface 900 may be displayed to the buyer via the user interface for exemptions 128 (FIG. 1).

Returning to FIG. 6, upon receiving the buyer input indicating the jurisdiction selection(s), exemption rationale(s), and buyer data (e.g., buyer identity data), and the like, the algorithm proceeds to block 644, where the requirements for each jurisdiction indicated by the jurisdiction selections may be determined. For example and as shown in FIG. 1, the exemption handling module 127 may query the exemption platform 181 for jurisdiction specific exemption rules corresponding to the jurisdictions indicated by the jurisdiction selection(s) according to the selected exemption rationale(s). The exemption rules may be stored in the tax rules database 184 in the exemption platform. For example, one or more of the exemption rules 191 from Jurisdiction A, the exemption rules 192 from Jurisdiction B, or the exemption rules 193 from Jurisdiction C may be located, retrieved, and used from the tax rules database 184. In such embodiments, the requirements for qualifying for an exemption according to a specific exemption rationale in a selected jurisdiction may be identified.

In some embodiments, different jurisdictions selections may have different applicable exemption rationales. In such embodiments, the exemption platform may apply exemption rationales that are applicable in each jurisdiction. In some embodiments, a specific rationale may not be applicable in each jurisdiction selected by the buyer. In such embodiments, the exemption handling platform may only apply the rationales that are applicable in a jurisdiction to the exemption certificate corresponding to the jurisdiction.

Upon determining the exemption requirements, the algorithm 628 proceeds to block 645 where the system retrieves stored forms for the jurisdictions. For example, the system may retrieve one or more forms (e.g., exemption certificates) corresponding to the jurisdiction selection(s) and the exemption rationale(s) having fillable fields therein for entering the buyer inputs. The exemption engine 180 may produce, or retrieve from the tax rules database 184, one or more blank exemption certificates having fillable fields corresponding to the jurisdiction selection(s) and the exemption rationale(s) provided by the buyer via the user interface for exemptions 128 and exemption handling module 127 (FIG. 1).

Responsive to retrieving the stored forms at block 645, the algorithm proceeds to block 647 to fill the buyer data in the one or more forms, by matching appropriately the known parameters with the fields requested in the one or more forms. For example, the exemption engine 180 may communicate the blank exemption certificate(s) or other fillable forms with the exemption handling module 127 and the exemption handling module 127 may fill the exemption certificate(s) with the buyer data (e.g., buyer identity data), transaction data (e.g., invoice data, amount(s), exempted taxes amount(s)), jurisdiction indication, exemption rational indication, or the like.

In some embodiments, the exemption handling module 127 may communicate the buyer data, transaction data, jurisdiction indication, exemption rational indication, etc. to the exemption engine 180 via the connector 188 and the API 182. The exemption engine 180 may fill the form (e.g., exemption certificate(s)) with at least some of the inputs listed above to provide at least partially completed exemption certificates.

In some embodiments, the at least partially blank form (e.g., exemption certificate) may be presented to the buyer for completion by the buyer. The buyer may input the required data into fillable fields therein.

Upon filling the buyer data into the forms, the algorithm 628 proceeds to block 648 to determine if the buyer inputs are valid. The buyer inputs may be validated by one or more of the exemption handling module 127, the buyer via the user interface for exemptions 128, or the exemption engine 180. For example, the exemption handling module 127 may determine if all fields in the form(s) that should be filled with buyer inputs have been filled with buyer inputs. The exemption handling module 127 may ascertain whether the buyer inputs entered into the form(s) (e.g., exemption certificates) are valid based on the data type required by the form, such as by comparing the buyer inputs to a template of acceptable data corresponding to the respective field(s).

If at block 648 the buyer inputs are deemed not valid, the algorithm proceeds to block 549 and exits the validation stage to receive inputs from the buyer at block 525 of FIG. 5. Referring briefly to FIG. 1, the buyer inputs may be stored and/or updated in a database in the memory 140, such as in one or more of the buyer space 138 or the registry 144 in the memory 140. For example, the exemption handling module 127 may relay the buyer inputs to the buyer space 138 in the memory 140 via the connector 188. The buyer inputs may augment or replace prior buyer inputs. In some embodiments, the buyer inputs may additionally or alternatively be stored in the exemption platform 181, such as in a buyer space stored therein.

If at block 648 the buyer inputs are validated, the algorithm 628 proceeds to block 650 to store or update the buyer inputs in the database. The buyer inputs may be stored in a database in the system, such as in the memory 140 or the within the exemption platform 181. Previously stored buyer inputs may be updated in the database with the most recent buyer inputs. For example, buyer inputs saved in the buyer space 138 may be updated with any new buyer inputs. The exemption handling module 127 may direct the storage or updating of the buyer inputs in the database. The buyer inputs from the form (e.g., incomplete exemption certificate or electronically fillable form used to create the same) may be extracted and saved in specifically dedicated portions of the database, such as in a buyer input portion of the buyer space in the memory of the electronic marketplace.

After operation 650, the algorithm 628 proceeds to block 654 where the system identifies the first seller the second seller corresponding to the first and second items. For example, the first identity data associated with the first item data and the first seller may be used to identify the first seller. The second identity data associated with the second item data and the second seller may be used to identify the second seller. The first identity data, the second identity data, the first item data, and the second item data may be relayed to or queried in the memory by the exemption handling module to identify the first seller or the second seller. Additional sellers may be identified from additional items at block 654 as disclosed above.

Based upon the identified sellers, the algorithm proceeds to block 660 where the system creates exemption certificates for each of the sellers. For example, the exemption handling module 127 or the exemption engine 180 may generate an exemption certificate for each seller identified at block 654 responsive to a single exemption request. The exemption certificates may be initially populated, and then filled, with the buyer inputs (e.g., buyer identity data), jurisdiction selection(s), exemption rationale, and transaction data (e.g., totals, sub-totals per item, total tax, tax per item) corresponding to a respective seller in the transaction. In such embodiments, the exemption certificates may be filled with seller data, such as the first seller identity data or the second identity data, respectively. The exemption certificates may be subsequently or contemporaneously filled with the first item data, the second item data, and the transaction data related thereto (e.g., itemized sales tax in exemption), respectively. The exemption handling module 127 or the exemption engine 180 may fill the exemption certificates with the data.

The filled or completed but unsigned exemption certificates may be displayed to the buyer via the electronic marketplace 120. For example, the filled but unsigned first and second exemption certificates may be displayed to the buyer via the user interface for exemptions 128.

After the exemption certificates have been generated for each of the sellers, the algorithm 628 proceeds to block 662 to enable the buyer to sign the exemption certificates. Enabling the buyer to sign the exemption certificates may be as described above with respect to FIG. 3. The user interface may allow the buyer to sign the exemption certificates. For example, the user interface allows the system to electronically receive a signature from the buyer for each exemption certificate, such as the first exemption certificate and the second exemption certificate. The user interface for receiving the signature(s) may be as disclosed above with respect to FIG. 4. For example, the user interface for exemptions 128 may display a user interface 400 for signing the exemption certificates. In such embodiments, a single signature (e.g., electronic signature) action may be applied to all exemption certificates from a transaction from a single sign in page. In some embodiments, each exemption certificate may be presented to the buyer separately for individual signature actions on each exemption certificate. In such embodiments, the buyer may separately sign each exemption certificate.

The algorithm 628 may proceed to block 664 to confirm that the buyer signed the exemption certificates. If not, the execution proceeds to operation 549 as before. If yes, then the signatures may be applied to the exemption certificates to complete the exemption certificates. For example, the signature(s) may be electronically applied to the filled but unsigned WIP exemption certificates, to form the signed exemption certificates, such as the first signed exemption certificate and the second signed exemption certificates.

Then the algorithm 628 proceeds to the block 670 of storing the signed exemption certificates for the sellers. For example, the signed exemption certificates may be stored in the memory of the electronic marketplace. In such embodiments, the first signed exemption certificate may be stored in the first seller space in the memory and the second signed exemption certificate may be stored in the second seller space in the memory of the electronic marketplace. Additional signed exemption certificates may be stored in additional seller spaces corresponding to additional sellers in the transaction.

Then the algorithm 628 may proceed to block 680 where the user interface displays an updated order with the sales tax. For example, responsive to obtaining and storing the signed exemption certificates, the exemption handling module may relay the exemption qualification status to the storefront. Referring back to FIG. 1, the storefront 121 or the exemption handling module 127 may update the order to display the total costs, without the sales tax included. The user interface 129 may display the updated order to the buyer via the user interface 129, such as in the storefront 121.

One or more portions of the algorithm 628 may be performed by exemption handling module 127, the store front 121, or the exemption platform 181, or other components of the configuration 100, such as via the user interfaces associated therewith. Upon displaying the updated order without the sales tax, the algorithm 628 proceeds to block 549 and continues beyond the receipt and validation of buyer input stage of the algorithm 628 as shown in the algorithm 500 of FIG. 5.

Returning to FIG. 5, upon receiving and validating the buyer's inputs, the algorithm 500 exits the receipt and validation phase at block 528 and continues at block 549 to block 525 where the user interface receives inputs from the buyer confirming the order as displayed. For example, the buyer may indicate that the updated order (without the payment(s) for sales tax) is correct, such as by a continue selection via the user interface.

The buyer may indicate that the (updated) order is not correct. If the buyer indicates that the order is not correct as displayed (including item names, item prices, item amounts, sales tax amount(s), payment totals, payment subtotals, taxes, or the like), the algorithm 500 returns to the block 512 described above. The algorithm 500 may be thus at least partially repeated until block 525, where the order may be confirmed.

If at block 525 the buyer confirms that the order is correct as displayed, the algorithm 500 proceeds to block 527 where the order is confirmed as displayed.

In accordance with the systems and methods carried out thereon, as disclosed herein, the systems and computer implemented methods disclosed herein generate exemption certificates for multiple sellers based on a single exemption request. In this context, one or more of the buyer 130 the first seller 131, the second seller 132, additional sellers, may be a user of a computer in communication with the electronic marketplace 120.

Figure 10:
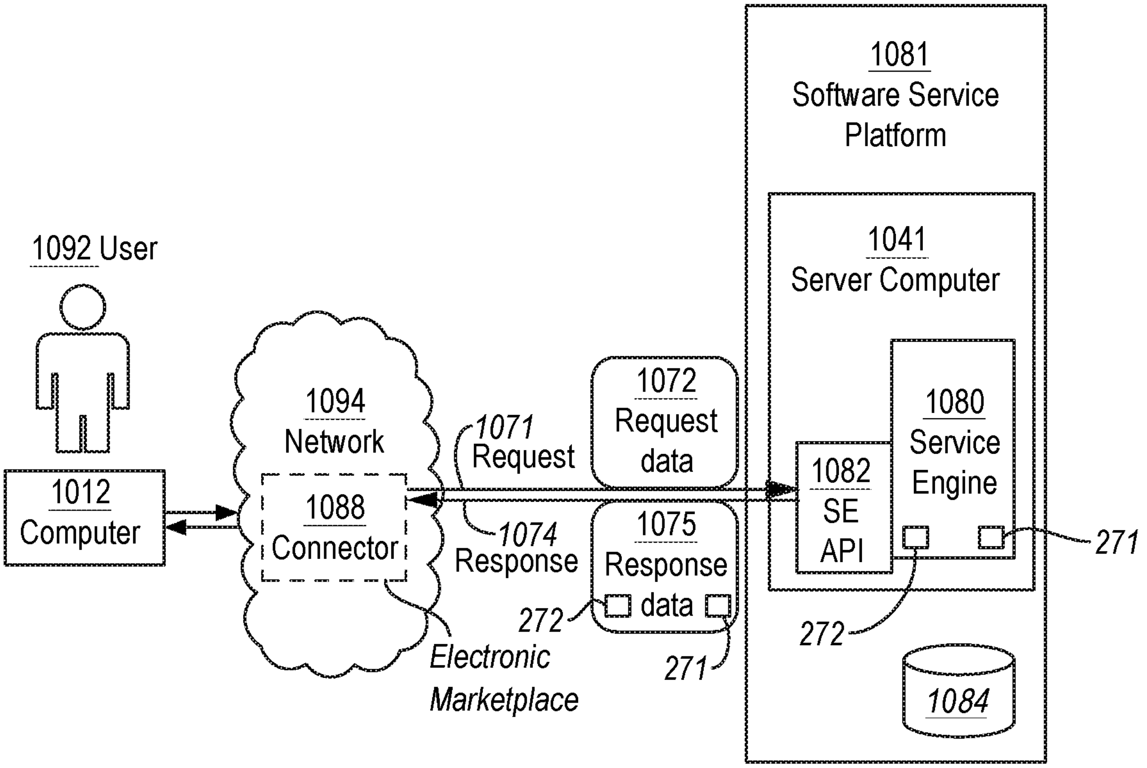
FIG. 10 shows a sample network configuration, according to embodiments.

FIG. 10 shows a network configuration working for producing multiple exemption certificates for multiple sellers responsive to a single exemption request, according to embodiments. A user 1092 may use computer 1012, which is sometimes called a client computer. The user 1092 may be the buyer from the sample configuration 100 described above with respect to FIG. 1. For example, the buyer 130 may include the computer 1012. Both the user 1092 and the computer 1012 may be located within a physical site, but that is not necessary. More details about computer 1012 are provided with reference to FIG. 11.

As shown, the computer 1012 may be used to communicate with a network 1094, such as to purchase items and initiate an exemption request as disclosed herein. In this example, the network 1094 is a communications network. Network 1094 can be any type of network, such as a local area network (LAN), a metropolitan area network (MAN), a wide area network (WAN), or the internet. In some embodiments, network 1094 is considered to be the cloud. A connector 1088 may be associated with the network 1094, if it is the cloud, or accessible by computer 1012 via network 1094. The connector 1088 may be similar or identical to the connector 188 of FIG. 1 in one or more aspects.

In this example, a software service platform 1081 is implemented by a server computer 1041 and a database 1084 storing data. The software service platform 1081 may be similar or identical to the exemption platform 181 of FIG. 1 in one or more aspects. Software service platform 1081 can be implemented in the cloud, on the premises of a provider, in a combination of the two, and so on. Of course, additional server computers may be used for a single service, for example in a peer-to-peer configuration, with the operations of the service distributed among them. The server computers can be located at a single geographic location or be distributed across multiple locations. Similarly, additional databases may be used for the service.

Server computer 1041 is configured, by software, to implement a service engine 1080. Service engine 1080 is configured to perform a predefined service, such as describe above with respect to the exemption engine 180 of FIG. 1. The service can be a computation, a search, a verification, a registration, a payment, or the like. In the context of FIG. 10, user 1092 desires the service, and may even pay for it. For example, one or more of the sellers, the buyer, or the electronic marketplace with the network 1094 may desire the exemption engine to produce exemption certificates and may pay for it. User 1092 uses computer 1012 to access network 1094 and, from network 1094, to access software service platform 1081. It will be appreciated that, in some contexts, service engine 1080 performs cloud computing and is provided as software as a service (SaaS). In such instances, computer 1012 can be considered to be a client computer from the perspective of software service platform 1081.

The service of service engine 1080 can be performed responsive to service engine 1080 being properly invoked. For example, the production of multiple exemption certificates corresponding to multiple sellers may be performed responsive to a single exemption request from the user or an electronic marketplace within the network 1094. While being performed, the service may use data from database 1084. For example, the database 1084 may store jurisdiction specific rules (e.g., tax rules), blank exemption certificates, or forms corresponding to the blank exemption certificates.

Server computer 1041 further hosts a service engine (SE) Application Programming Interface (API) 1082. The SE API 1082 may be similar or identical to the API 182 shown in FIG. 1. SE API 1082 is configured to invoke service engine 1080 to perform its service, when properly requested. In some embodiments, the network 1094 may be hosted on one or more server computers similar to or identical to the server computer 1041, in one or more aspects.

SE API 1082 is configured to receive a request 1071, which is shown as an arrow. Request 1071 may be transmitted via network 1094. Request 1071 may have been ultimately caused to be generated by computer 1012, for example as operated by user 1092. In some embodiments, request 1071 is transmitted via network 1094 directly to SE API 1082. In other embodiments, computer 1012 causes network 1094 to transmit request 1071. In yet other embodiments, network 1094 originates request 1071 on behalf of the user 1092. The request 1071 may be an exemption request or a request to provide exemption certificates.

Request 1071 may also include associated request data 1072. The request data 1072 may include one or more of jurisdiction selections, exemption rationales, buyer identity data, seller identity data, transaction data, an indication of the number of exemption certificates sought (e.g., how many sellers need an exemption certificate), or the like to produce exemption certificates for the multiple sellers based on the single request 1071. When SE API 1082 receives request 1071 with its request data 1072, it invokes service engine 1080. When thus invoked, service engine 1080 may perform its service using request data 1072. In response, SE API 1082 can be configured to transmit a transmit a response 1074, also shown as an arrow. For example, the service engine 1080 may produce multiple WIP certificates (e.g., blank or at least partially populated exemption certificates) corresponding to multiple sellers in a transaction carried out on the network 1094, such as WIP certificates 271 and 272 (FIG. 2). Response 1074 may include response data 1075 that arises out of the service, such as a computed result, a confirmation, or the like. For example, the response may include multiple WIP certificates corresponding to multiple sellers, in the response data 1075. Response 1074 can be transmitted back to the sender of request 1071, the network 1094 via the connector 1088, or as otherwise directed. For example, WIP certificates 271 and 272, which are at least partially uncompleted, may be transmitted to the network 1094 (e.g., to a user interface of an electronic marketplace therein) or the buyer for completion.

Computer program code for carrying out operations for aspects of the present invention may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on server computer 1041, computer 1012, a computer in network 1094, and so on.

Figure 11:
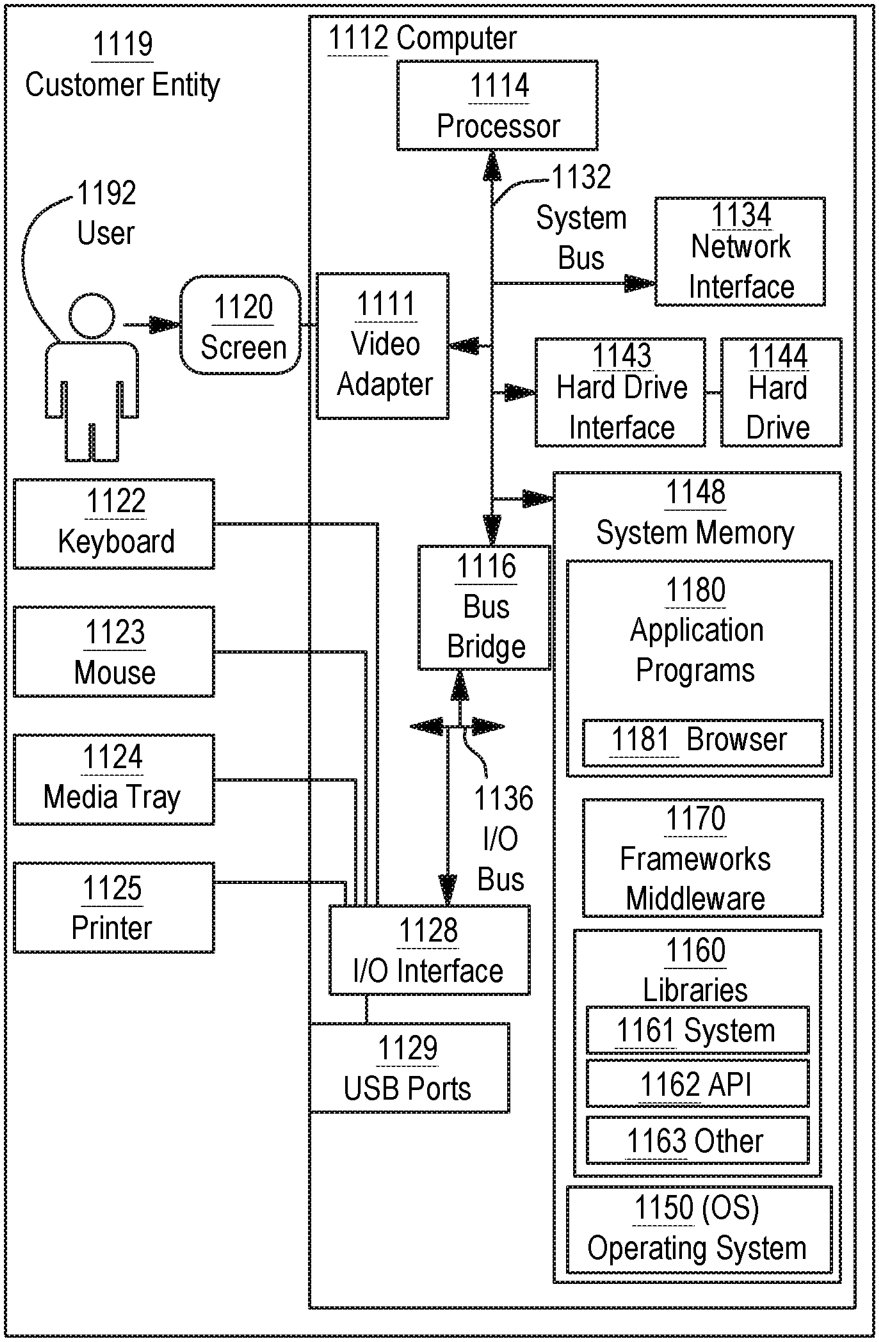
FIG. 11 shows more details of a computer of a customer entity of FIG. 10, with reference to the communication network and the software service platform according to embodiments.

Additional details about the components of FIG. 10, are provided below. FIG. 11 shows details of a customer entity 1119, according to embodiments. The customer entity 1119 may be the buyer or a seller. The customer entity 1119 may initiate generation of multiple exemption certificates (WIP certificates 271 and 272) corresponding to multiple sellers responsive to a single exemption request. In such embodiments, the customer entity 1119 is the buyer. The customer entity 1119 may input item data into an electronic marketplace to sell the corresponding items. The customer entity 1119 may receive one of multiple exemption certificates (e.g., signed exemption certificates 161 or 162) corresponding to multiple sellers responsive to a single exemption request. In such embodiments, the customer entity 1119 is the seller. The computer 1112 can be the computer of the buyer, sellers, or the electronic marketplace.

FIG. 11 shows customer entity 1119, along with more sample details for computer 1112. Computer 1112 may be a desktop computer, a laptop computer, a tablet computer, a mobile phone, a smartwatch, or the like. The computer 1012 may be similar or identical to the computer 112 (FIG. 1) or the computer 1012 (FIG. 10) in one or more aspects. Computer 1112 includes a system bus 1132 that is coupled to processor 1114. System bus 1132 can be used by processor 1114 to control and/or communicate with other components of computer 1112.

Computer 1112 additionally includes a network interface 1134 that is coupled to system bus 1132. Network interface 1134 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Such a hardware network interface may have its own software. Network interface 1134 can access network. The network may be similar or identical to the network 194 (FIG. 1) or the network 1094 (FIG. 10) in one or more aspects.

Computer 1112 further includes a video adapter 1111, which is also coupled to system bus 1132. Video adapter 1111 may be able to drive and/or support a screen 1120 that is used by user 1192 together with computer 1112. For example, the video adapter may drive and support the screen 1120 to display the user interface 129 and the user interface for exemptions 128 (FIG. 1).

In addition to screen 1120, other peripheral input/output (I/O) devices that may be used together with computer 1112 include a keyboard 1122, a mouse 1123, a media tray 1124 and a printer 1125. Media tray 1124 may include storage devices such as CD-ROM drives, multi-media interfaces, and so on. Computer 1112 moreover includes an I/O interface 1128 connected to these peripheral I/O devices as shown, for the purpose of communicating with them. In this example these connections are direct. Alternately, one or more of these connections may take place via universal serial bus (USB) ports 1129 of computer 1112, to which I/O interface 1128 is also connected.

Computer 1112 moreover includes a bus bridge 1116 coupled to system bus 1132, and an input/output (I/O) bus 1136. I/O bus 1136 is coupled to bus bridge 1116 and to I/O interface 1128.

Computer 1012 also includes various memory components. A non-volatile memory component is a hard drive 1144. Computer 1112 further includes a hard drive interface 1142 that is coupled to hard drive 1144 and system bus 1132.

Additional memory components are in a system memory 1148, which is also coupled to system bus 1132. System memory includes volatile memory including, but not limited to, cache memory, registers and buffers. In embodiments, data from hard drive 1144 populates registers of the volatile memory of system memory 1148. The system memory 1148 may include the memory 140. The registers may include the registry 144.

Sample system memory 1148 has a software architecture that uses a stack of layers, with each layer providing a particular functionality. In this example the layers include-starting from the bottom—an operating system (OS) 1150, libraries 1160, frameworks/middleware 1170 and application programs 1180. Other software architectures may include less, more or different layers. For example, a presentation layer may also be included. For another example, some mobile or special purpose operating systems may not provide a frameworks/middleware 1170.

OS 1150 may manage hardware resources and provide common services. Libraries 1160 provide a common infrastructure that is used by applications 1180 and/or other components and/or layers. Libraries 1160 provide functionality that allows other software components to perform tasks more easily than to interface directly with the specific underlying functionality of OS 1150. Libraries 1160 may include system libraries 1161, such as a C standard library. System libraries 1161 may provide functions such as memory allocation functions, string manipulation functions, mathematical functions, and the like.

In addition, libraries 1160 may include API libraries 1162 and other libraries 1163. API libraries 1162 may include media libraries, such as libraries to support presentation and manipulation of various media formats such as MPREG4, H.264, MP3, AAC, AMR, JPG, and PNG. API libraries 1162 may also include graphics libraries, for instance an OpenGL framework that may be used to render 2D and 3D in a graphic content on screen 1120. API libraries 1162 may further include database libraries, for instance SQLite, which may support various relational database functions. API libraries 1162 may additionally include web libraries, for instance WebKit, which may support web browsing functionality.

Frameworks/middleware 1170 may provide a higher-level common infrastructure that may be used by applications 1180 and/or other software components/modules. For example, frameworks/middleware 1170 may provide various graphic user interface (GUI) functions, high-level resource management, high-level location services, and so forth. Frameworks/middleware 1170 may provide a broad spectrum of other APIs that may be used by applications 1180 and/or other software components/modules, some of which may be specific to OS 1150 or to a platform.

Application programs 1180 are also known more simply as applications and apps. One such app is a browser 1181. Browser 1181 is an example of a renderer, which includes program modules and instructions that enable computer 1112 to exchange network messages with a network using hypertext transfer protocol (HTTP) messaging.

Other such applications 1180 may include a contacts application, a book reader application, a location application, a media application, a messaging application, and so on. Applications 1180 may be developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. Applications 1180 may use built-in functions of OS 1150, libraries 1160, and frameworks/middleware 1170 to create user interfaces for user 1192 to interact with.

The hardware elements depicted in computer 1112 are not intended to be exhaustive. Rather, they are representative, for highlighting essential components that can be used with embodiments.

As noted above, the customer entity 1119 in FIG. 11 may be the buyer, any of the sellers, or another entity. For example, the customer entity 1119 may be the buyer and the buyer may access the network (1094) to view and purchase items offered by the first seller and the second seller. Another customer entity 1119 may be the first seller and the first seller may upload item data corresponding to an item into the network to offer the item for sale. A second seller or any number of additional sellers may be additional or alternative customer entities and may upload item data corresponding to an item into the network to offer the item for sale. Additional details about FIG. 11, are provided near the end of this description.

Methods according to embodiments for generating or obtaining exemption certificates for multiple sellers in a single transaction responsive to a single exemption request may be carried out with the systems, components thereof, and algorithms disclosed herein.

Figure 12:
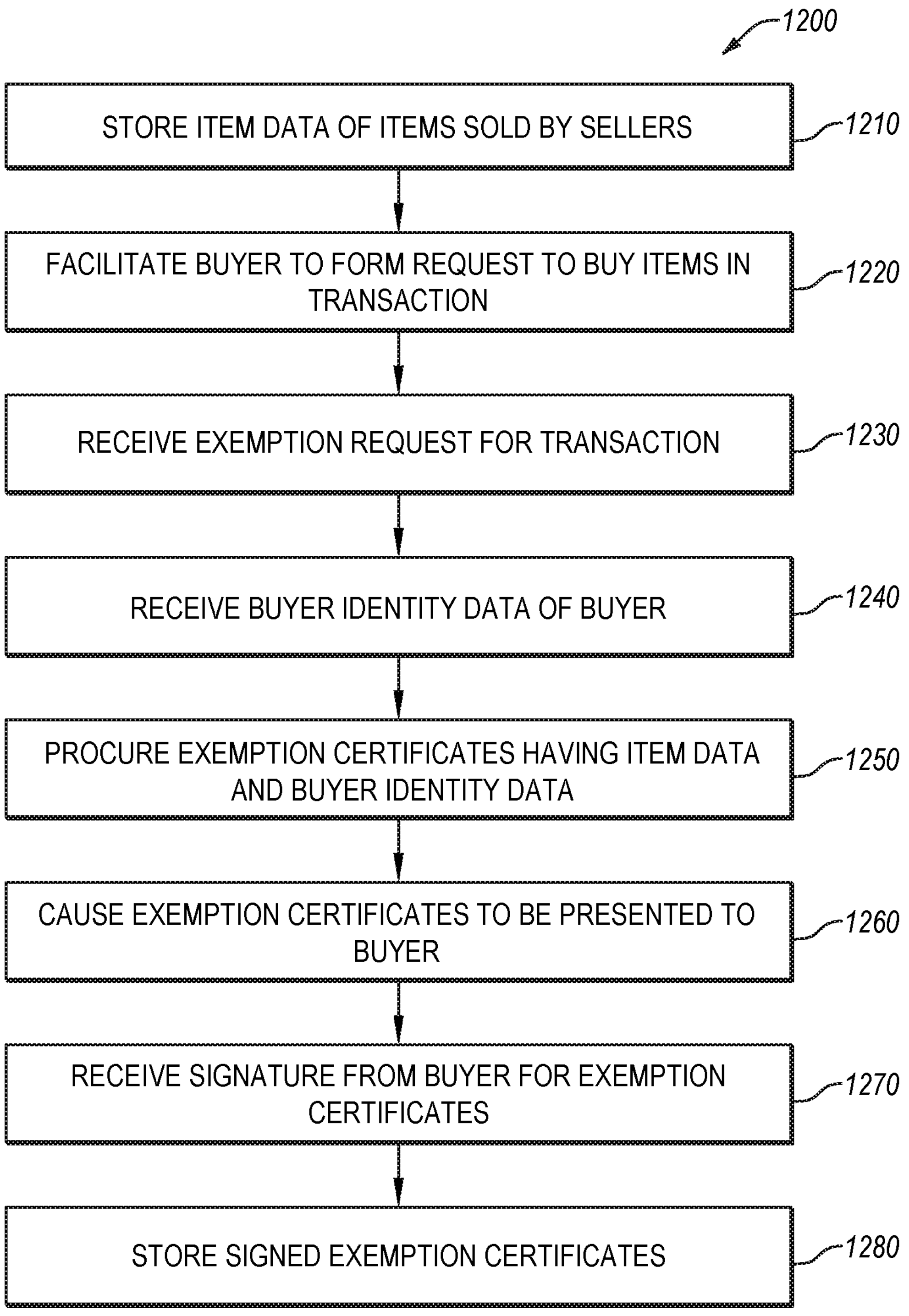
FIG. 12 shows a flow diagram of a computer-implemented method for a service platform, according to embodiments.

FIG. 12 is a flow diagram of a computer-implemented method 1200 for a service platform, according to embodiments. The computer-implemented method includes a block 1210 to store item data of items sold by sellers; a block 1220 to facilitate buyer to form request to buy items in transaction; a block 1230 to receive exemption request for transaction; a block 1240 to receive buyer identity data of buyer; a block 1250 to procure exemption certificates having item data and buyer identity data, which is also known as generating such exemption certificates; a block 1260 to cause exemption certificates to be presented to buyer; a block 1270 to receive signature from buyer for the exemption certificates; and a block 1280 to store signed exemption certificates. In some embodiments, at least some of the acts in blocks 1210-1280 may be performed in a different order than presented, may be combined, may be omitted, or may have additional acts performed therebetween. For example, the block 1260 to cause exemption certificates to be presented to buyer may be omitted from the computer-implemented method 1200.

The block 1210 to store item data of items sold by sellers may include storing first item data of a first item sold (e.g., offered or actually sold) by a first seller, first identity data of the first seller, second item data of a second item sold by a second seller, and second identity data of the second seller. Storing first item data of a first item sold by a first seller, first identity data of the first seller, second item data of a second item sold by a second seller, and second identity data of the second seller may include storing the first item data, first identity data, second item data, and second identity data in a memory of an electronic marketplace from which the user interface is provided.

The block 1220 to facilitate buyer to form request to buy items in transaction may include facilitating a buyer to form a request to buy the first item and the second item, the request to buy including the first item data and the second item data, in a transaction. For example, the electronic marketplace displays items available for purchase via an electronic transaction. Facilitating may include providing a platform to select items for purchase, such as a shopping cart in the storefront. Facilitating may include providing a platform to purchase the items in the electronic marketplace, such as a checkout function to order multiple items in a single transaction (e.g., items in the shopping cart).

The block 1230 to receive exemption request for transaction may include receiving, from the buyer via a user interface, an exemption request for the single transaction. Receiving the exemption request may include receiving the exemption request via the storefront or user interface for exemptions, as disclosed herein. The exemption handling module may receive the exemption request as disclosed herein. For example, the buyer in the transaction may select an option to claim an exemption in the storefront or user interface for exemptions, which is received by the exemption handling module.

The block 1240 to receive buyer identity data of buyer may include receiving buyer identity data of the buyer in connection with the exemption request. Receiving buyer identity data may include receiving the buyer identity data via the buyer entering the buyer data into the user interface in the electronic marketplace. The exemption handling module may retrieve the buyer identity data from the memory of the electronic marketplace, such as buyer identity data from a previous transaction, previously generated exemption certificates, a buyer profile previously provided by the buyer, or the like.

The block 1250 to procure exemption certificates having item data and buyer identity data may include procuring, in response to the exemption request, a first exemption certificate including at least some of the first identity data and at least some of the buyer identity data, and a second exemption certificate including at least some of the second identity data and at least some of the buyer identity data. The exemption requests may include exemption rationales and jurisdiction selections provided by the buyer. Procuring exemption certificates may include transmitting a certificate request to a remote server, the certificate request including the item data and associated seller identity data for the transaction along with the buyer identity data and receiving, in response to the transmitted certificate request, the first exemption certificate and the second exemption certificate from the remote server. For example, the remote server (e.g., exemption platform) may transmit at least partially unfilled exemption certificates (e.g., WIP certificates) corresponding to the multiple sellers of the transaction to the electronic marketplace (e.g., exemption handling module).

The block 1260 to cause exemption certificates to be presented to buyer may include causing, via the user interface, the first exemption certificate and the second exemption certificate to be presented to the buyer. Presenting the exemption certificates may include displaying the first exemption certificate and the second exemption certificate on a client device used by the buyer, via the user interface.

The block 1270 to receive signature from buyer for exemption certificates may include electronically receiving a signature from the buyer for each of the first exemption certificate and the second exemption certificate, such as by providing a single electronic signature field to the buyer for both the first exemption certificate and the second exemption certificate, via the user interface. The single electronically received signature may be applied to all of the exemption certificates (WIP certificates) of the plurality of exemption certificates. In such embodiments, electronically receiving the signature may be as disclosed above with respect to FIG. 4. The electronic signature may be separately provided and received for each exemption certificate of the plurality of exemption certificates.

The block 1280 to store signed exemption certificates may include storing signed first and second exemption certificates, such as in a memory of an electronic marketplace from which the user interface is provided. Storing the signed exemption certificates may include storing the signed exemption certificates in respective seller spaces within the memory of the electronic marketplace as disclosed herein.

The computer-implemented method 1200 may include causing the user interface to display, responsive to the request to buy, a proposed payment for the first item, the second item, and a proposed payment of sales tax. For example, the storefront (e.g., via a checkout page therein) may display a total price for the transaction, such as itemized prices for the items, a total for all items, sales tax for all items, or sum of the foregoing. Such display may be responsive to electronically receiving the signature, a proposed payment for the items, without the proposed payment of sales tax.

The computer-implemented method 1200 may include causing a client device (e.g., client computer of the buyer) to display, responsive to the request to buy, a proposed payment for the first item, the second item, and a proposed payment of sales tax.

While examples provided above are discussed with first and second items, first and second sellers, first and second exemption certificates and the like, it should be understood that the computer implemented method 1200 may be carried out with additional items, additional sellers, additional exemption certificates, and the like. The acts for storing, facilitating, procuring, causing, electronically receiving, and storing with respect to the additional sellers, additional items, and additional exemption certificates may be similar or identical the blocks 1210-1280 disclosed above, in one or more aspects.

Figure 13:
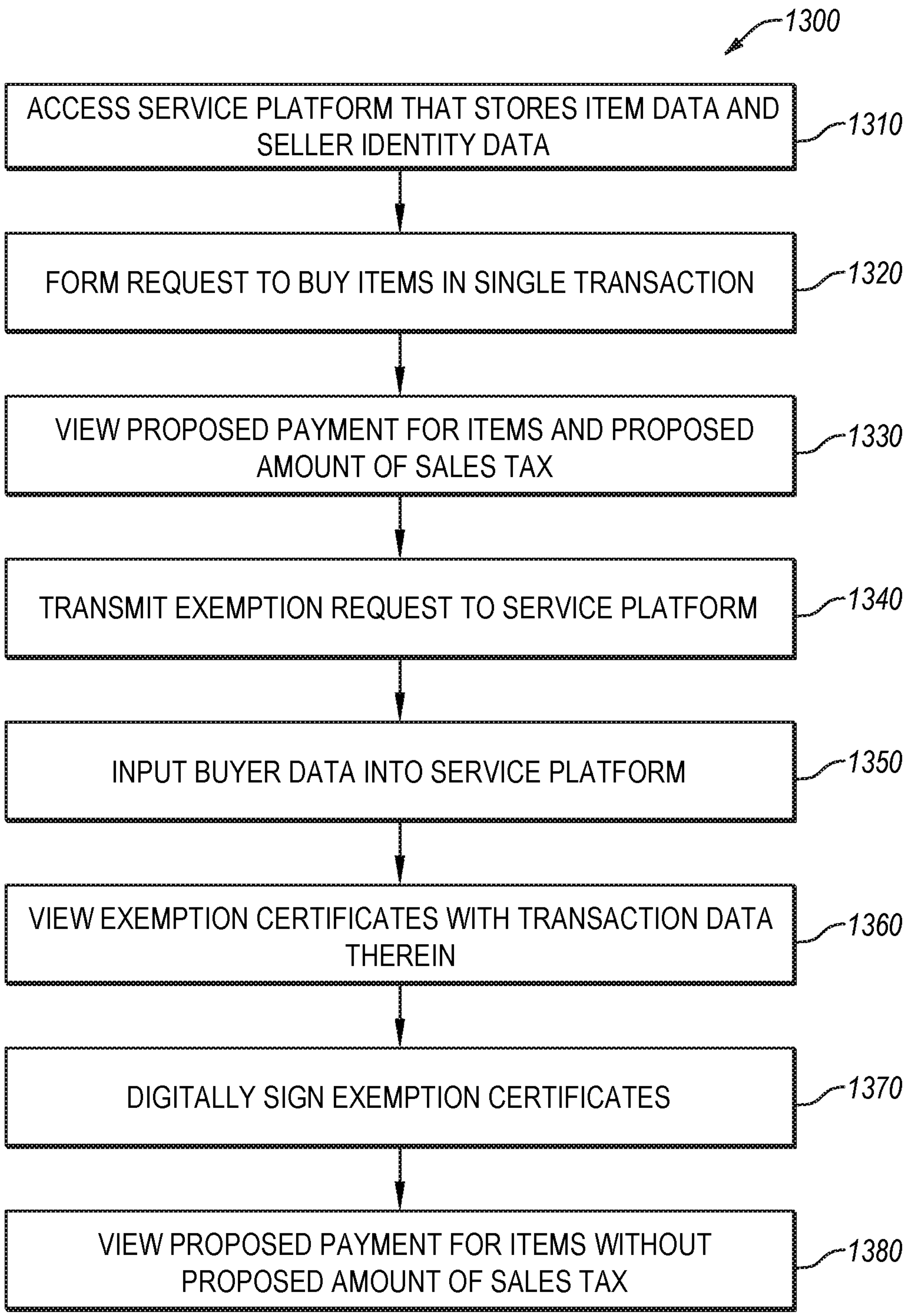
FIG. 13 shows a flow diagram of a computer-implemented method, according to embodiments.

FIG. 13 is a flow diagram of a computer-implemented method 1300, according to embodiments. The computer-implemented method includes a block 1310 to access service platform that stores item data and seller identity data; a block 1320 to form request to buy items in single transaction; a block 1330 to view proposed payment for items and proposed amount of sales tax; a block 1340 to transmit exemption request to service platform; a block 1350 to input buyer data into service platform; a block 1360 to view exemption certificates with transaction data therein; a block 1370 to digitally sign exemption certificates; and a block 1380 to view proposed payment for items without proposed amount of sales tax. In some embodiments, at least some of the acts in blocks 1310-1380 may be performed in a different order than presented, may be combined, may be omitted, or may have additional acts performed therebetween. For example, the block 1330 to view proposed payment for items and proposed amount of sales tax may be omitted from the computer-implemented method 1300.

The block 1310 to access service platform that stores item data and seller identity data may include accessing, via a client computer, a service platform that stores first item data of a first item sold by a first seller, first identity data of the first seller, second item data of a second item sold by a second seller, and second identity data of the second seller. The service platform may include an electronic marketplace as disclosed herein. Accessing a service platform may include using a client computer to access and view the electronic marketplace, such as accessing the electronic marketplace via a web page.

The block 1320 to form request to buy items in single transaction may include forming a request to buy, in a single transaction, the first item and the second item in the service platform. Forming the request may include selecting items to purchase on the service platform, such as by placing items in a cart in the electronic marketplace. Forming the request may include entering a payment or finish transaction phase (e.g., checkout) in the electronic marketplace, such as via instructions entered into the service platform by a buyer at a client computer in communication therewith.

The block 1330 to view proposed payment for items and proposed amount of sales tax may include viewing on a screen of the client computer via a user interface generated by the service platform, responsive to the request, a proposed payment for the first item, the second item, and a proposed amount of sales tax. The client computer may be a buyer's computer, cellular phone, tablet, or the like. The proposed payment may be viewed in a checkout page of the electronic marketplace. In some embodiments, viewing the proposed payment may include viewing a shopping cart, selecting a checkout option, or the like in the electronic market place.

The block 1340 to transmitting exemption request to service platform may include transmitting, from the client computer, an exemption request to the service platform in connection with the single transaction, such as by selecting an option to claim an exemption from taxes in the electronic marketplace (e.g., in a storefront therein). For example, transmitting the exemption request may include selecting an exemption request field in the electronic marketplace, such as via the user interface.

The block 1350 to input buyer data into service platform may include inputting buyer identity data into the service platform in connection with the exemption request. Inputting buyer data into the service platform may include entering buyer identity data into a buyer profile in the electronic marketplace, such as prior to forming the request to buy (e.g., order). Inputting buyer data may include providing the buyer identity data into the electronic marketplace contemporaneously with or after forming the request to buy, such as responsive to selecting a checkout option or making an exemption request. Inputting buyer identity may include entering buyer identity data from (e.g., at or with) a client computer, such as the buyer's computer.

Inputting buyer identity data into the service platform in connection with the exemption request may include accessing buyer identity data stored in the service platform to prepopulate buyer identity data fields. The buyer identity data fields may be located in WIP certificates. The buyer identity data may be retrieved from a buyer profile, a previous transaction of the buyer, or a previously generated exemption certificate of the buyer in the memory.

The block 1360 to view exemption certificates with transaction data therein may include viewing, on the screen via the user interface, a first exemption certificate including at least some of the first identity data and at least some of the buyer identity data, and a second exemption certificate including at least some of the second identity data and at least some of the buyer identity data. Viewing exemption certificates may include viewing the exemption certificates (WIP certificates) on a buyer computer, such as via the user interface or the user interface for exemptions provided by the electronic marketplace. The exemption certificates may be viewed individually or as a single exemption certificate template that is to be duplicated to form multiple exemption certificates for multiple sellers. The exemption certificates may be presented in the user interface, such as in a confirmation screen of the user interface for exemption.

The block 1370 to digitally sign exemption certificates may include digitally signing the first exemption certificate and the second exemption certificate. Digitally signing the exemption certificates provides signed exemption certificates, which have the legal effect of demonstrating that the sellers are not responsible, respectively, for remitting taxes for the transaction. Digitally signing the exemption certificates may be similar or identical to the techniques disclosed above with respect to FIG. 4.

The block 1380 to view proposed payment for items without proposed amount of sales tax may include viewing, on the screen, responsive to digitally signing the first exemption certificate and the second exemption certificate, a proposed payment for the first item and the second item, without the proposed amount of sales tax. Viewing may be carried out on the buyer's computer, such as via the user interface displayed thereon. Viewing may include viewing the proposed payment in a checkout of the electronic marketplace.

The computer-implemented method 1300 may further include providing, from the client computer, along with transmitting the exemption request, a rationale for the exemption request. The exemption rationale may be selected from a list of rationales by the buyer. The exemption rationale may be typed into a fillable field by the buyer. In some embodiments, more than one exemption rationale may be provided by the buyer. For example, a first exemption rationale may be claimed in a first jurisdiction and a second exemption rationale may be claimed in a second jurisdiction.

The computer-implemented method 1300 may further include providing, from the client computer, along with transmitting the exemption request, one or more jurisdiction selections. The one or more jurisdiction selections may indicate the jurisdictions in which the buyer claims an exemption. The buyer may select the jurisdictions from a list or enter the jurisdictions in a field in the user interface of the electronic marketplace. The jurisdiction selections may be automatically determined and provided by the service platform based on the location of the buyer or the locations of the sellers.

The computer-implemented method 1300 may further include providing the proposed payment for the first item and the second item, without the proposed amount of sales tax, after digitally signing the first exemption certificate and the second exemption certificate. For example, the buyer may provide payment information to the electronic marketplace, such as a credit card payment information (e.g., credit card number, expiration date, and CVV number), charge account, gift card numbers, apple pay verification, or the like. The buyer may verify a payment via pre-set payment parameters, such as by providing a password or the like.

While examples provided above are discussed with first and second items, first and second sellers, first and second exemption certificates and the like, it should be understood that the computer-implemented method 1300 may be carried out with additional items, additional sellers, additional exemption certificates, and the like. By including additional items, etc. to the request to buy, the additional items are added to the request disclosed above and are processed through the method 1300 in the same manner as the first and second items disclosed herein. The acts for forming, viewing, viewing, digitally signing, and viewing with respect to the additional items, additional sellers, and additional exemption certificates may be similar or identical the blocks 1310-1380 disclosed above, in one or more aspects.

Figure 14:
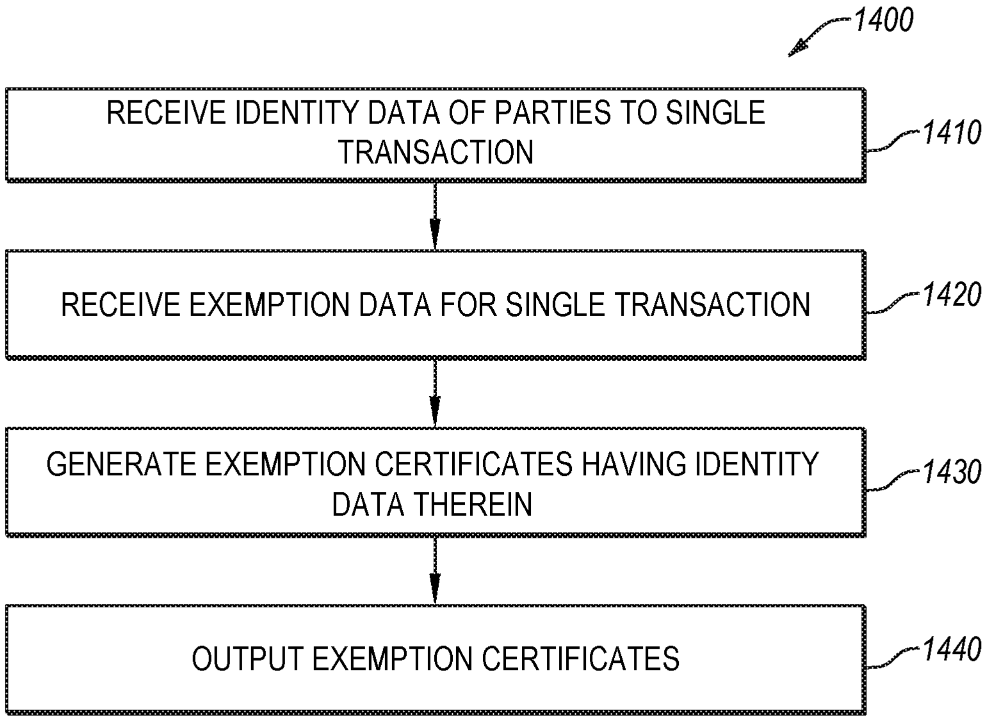
FIG. 14 shows a flow diagram of a method for a computer system to use identity data from a service platform to generate exemption certificates, according to embodiments.

FIG. 14 is a flow diagram of a method 1400 for a computer system to use identity data from a service platform to generate exemption certificates, according to embodiments. The computer-implemented method includes a block 1410 to receive identity data of parties to single transaction; a block 1420 to receive exemption data for single transaction; a block 1430 to generate exemption certificates having identity data therein; and a block 1440 to output exemption certificates. In some embodiments, at least some of the acts in blocks 1410-1440 may be performed in a different order than presented, may be combined, may be omitted, or may have additional acts performed therebetween. For example, the block 1440 to output the exemption certificates may be omitted from the computer-implemented method 1400.

The block 1410 to receive identity data of parties to single transaction may include receiving, from the service platform, first identity data of a first seller of a first item, second identity data of a second seller of a second item, and buyer identity data of a buyer who is buying the first item and the second item in a single transaction. The service platform (e.g., electronic marketplace) may fetch the identity data from the memory of the service platform, such as from buyer spaces or seller spaces in the memory of the electronic marketplace. The service platform may receive at least some of the identity data from a client computer, such as from the buyer or sellers, and relay the identity data to the exemption platform.

The first identity data, the second identity data, and the buyer identity data may be received from an exemption handling module of the electronic marketplace. The receiving may be carried out by an additional service platform, such as the exemption platform in communication with the electronic marketplace. In such embodiments, the receiving may be carried out via an API, such as the API operably coupled to the exemption engine.

The block 1420 to receive exemption data for single transaction may include receiving, from the service platform, exemption data per which the buyer claims an exemption for the single transaction. The exemption data may include one or more jurisdiction selections and one more selected exemption rationales.

The exemption data may be received from the exemption handling module of the electronic marketplace. The receiving may be carried out by an additional service platform, such as the exemption platform in communication with the electronic marketplace. In such embodiments, the receiving may be carried out via an API, such as the API operably coupled to the exemption engine.

The block 1430 to generate exemption certificates having identity data therein may include generating a first exemption certificate including at least some of the first identity data and at least some of the buyer identity data, and a second exemption certificate including at least some of the second identity data and at least some of the buyer identity data, responsive to receiving the buyer identity data, the first identity data, second identity data, and the exemption data. The first exemption certificate may be directed to the first seller of the first item and the second exemption certificate may be directed to the second seller of the second item, of the single transaction. The exemption certificates are generated responsive to a single exemption request. Generating exemption certificates may be carried out by the exemption platform, such as by the exemption engine therein as disclosed herein. For example, the exemption engine may utilize the exemption rationale and jurisdiction selection(s) to identify and retrieve the applicable forms or exemption certificates for the identified circumstances, such as from a database of tax or exemption rules in the exemption platform as disclosed herein.

Once the applicable forms or certificates are identified, the exemption engine may retrieve the applicable forms or exemption certificates from the database. The as-yet unfiled exemption certificates may be directly retrieved or may be made using forms having fillable fields. For example, generating a first exemption certificate including at least some of the first identity data and at least some of the buyer identity data and a second exemption certificate including at least some of the second identity data and at least some of the buyer identity data may include locating an exemption form corresponding to the exemption data, populating the exemption form with the first identity data and the buyer identity data to generate the first exemption certificate, and populating the exemption form with the second identity data and the buyer identity data to generate the second exemption certificate. Such acts may be carried out for each seller identified by respective seller identity data, such as the second seller and any additional sellers.

The block 1440 to output exemption certificates includes outputting multiple exemption requests to multiple sellers of a single transaction. The output exemption certificates may be as-yet unfinished exemption certificates (e.g., WIP certificates). The output exemption certificates may be output in any file format or data type. Outputting the exemption certificates is responsive to the single exemption request corresponding to the single transaction.

The block 1440 to output exemption certificates may include outputting the exemption certificates to the service platform, such as to the exemption handling module of the electronic marketplace, via the exemption platform.

The method 1400 may include storing the first exemption certificate and the second exemption certificate in a database of exemption certificates. For example, the first exemption certificate and the second exemption certificate may be stored in one or more of the electronic marketplace (in the memory therein) or the exemption platform (in the database therein), such as in separate seller spaces for the respective sellers, a transaction space for the associated transaction, or the buyer space.

While examples provided above are discussed with first and second items, first and second sellers, first and second exemption certificates and the like, it should be understood that the computer-implemented method 1400 may be carried out with additional items, additional sellers, additional exemption certificates, and the like. The acts for receiving, generating and outputting with respect to the additional sellers, the additional items, and the additional exemption certificates may be similar or identical the blocks 1410-1440 disclosed above, in one or more aspects.

One or more portions of methods 1200, 1300, or 1400 may be carried out by one or more portions of the configuration 100 (FIG. 1), and also with the variations described above. For example, computing devices including the service platforms, such as the electronic marketplace or the exemption platform; the buyer at a computer thereof; or the seller(s) at a computer thereof may carry out one or more portions of computer-implemented method 1200, 1300, or 1400. The one or more portions of computer-implemented method 1200, 1300, or 1400 may be carried out by one or more processors according to machine readable an executable instructions stored on a non-transitory computer readable medium of the respective computing device(s).

Additional details about FIG. 10 and FIG. 11 are now provided. Instructions for performing any of the methods or functions described herein may be stored, completely or partially, within the memory components of network 1094, server computer 1041, computer 1012, computer 1112 etc. For example, the exemption platform 181 and the electronic marketplace 120 may be located on memory components of server computers or computers to provide the configuration 100 and the acts carried out therewith. The memory components include the indicated memory components, plus cache memory within the processors such as processor 1014. Accordingly, these memory components are sample embodiments of machine-readable media.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. Such tangible media may also be referred to as non-transitory computer readable storage media or mediums.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or portion of the methods described herein. For example, the machine readable medium or media may include a non-transitory computer-readable storage medium having instructions stored thereon which, when executed by the one or more processors, result in one or more operations of the methods disclosed herein, such as for generating or obtaining a plurality of certificates. Accordingly, instructions transform a general, non-programmed machine into a particular machine programmed to carry out the described and illustrated functions in the manner described. Such machine readable mediums may be present in one or more of the computer 112, 1012, or 1112 of the customer entity, the server computer 141 or 1041, or one or more computing devices hosting the electronic marketplace.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor 1114, as well as the processor of server computer 1141, is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores". The processor 1114 can read and execute instructions stored as machine readable code on the memory storage medium. Such instructions can include instructions for performing any of the methods or portions thereof disclosed herein.

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

While various aspects and embodiments have been disclosed herein, other aspects and embodiments are contemplated. The various aspects and embodiments disclosed herein are for purposes of illustration and are not intended to be limiting.

The invention claimed is:

1. A computer-implemented method for a service platform, the computer-implemented method comprising:

a first electronic service platform electronically storing in a computer memory of the first electronic service platform, first item data of a first item associated with a first electronic system, first identity data associated with the first electronic system, second item data of a second item associated with a second electronic system, and second identity data associated with the second electronic system;

based on the electronically storing of the first item data and the second item data, electronically generating and displaying a graphical user interface that includes a selection option for electronically submitting a single request for a plurality of electronic documents associated with the first item and the second item;

in response to receiving electronic input from a third electronic system indicating a selection, via the graphical user interface, of the selection option for electronically submitting the single request for a plurality of electronic documents associated with the first item and the second item;

electronically generating and displaying a second graphical user interface within the first graphical user interface for electronically submitting the single request for the plurality of electronic documents associated with the first item and the second item, in which the second graphical user interface within the first graphical user interface is operably coupled to a module via a connector that is also operably coupled to the first electronic service platform, the computer memory of the first electronic service platform where the first item data and second item data are stored, and a second electronic service platform; and electronically relaying via the connector, to the second electronic service platform, the single request for the plurality of electronic documents associated with the first item and the second item, in which the single request includes the first item data of the first item and the second item data of the second item;

in response to the electronically relaying via the connector to the second electronic service platform, the single request for the plurality of electronic documents electronically receiving from the second electronic service platform, via the connector indications of data required to receive the plurality of electronic documents displayed as fillable fields on the second graphical user interface within the first graphical user interface, in which the fillable fields are at least for the identity data associated with the third electronic system in connection with the single request;

electronically receiving, via the fillable fields in the fillable fields on the second graphical user interface within the first graphical user interface, the identity data associated with the third electronic system in connection with the single request;

electronically storing in the computer memory, as part of a specific computer memory registry specifically associated with the third electronic system, the identity data associated with the third electronic system;

electronically generating a first electronic document of the plurality of electronic documents including at least some of the first identity data and at least some of the third electronic system identity data, and a second electronic document of the plurality of electronic documents, including at least some of the second identity data and at least some of the third electronic system identity data;

electronically causing, via the second graphical user interface, the first electronic document and the second electronic document to be presented;

electronically receiving an electronic signature from the a user associated with the third electronic system for each of the first electronic document and the second electronic document;

electronically storing the signed first and second electronic documents; and upon a logging into the first electronic service platform by the user associated with the third electronic system, the first electronic service platform referencing the computer memory registry to electronically match sign-on credentials of the user associated with the third electronic system with corresponding identity data in the computer memory registry for use in subsequent requests for electronic documents associated with the user, avoiding needing to use computing resources to obtain corresponding identity data via a user interface each time a request for electronic documents requiring the corresponding identity data is received.

2. The computer-implemented method of claim 1, wherein storing first item data of a first item sold by a first seller, first identity data of the first seller, second item data of a second item sold by a second seller, and second identity data of the second seller includes storing the first item data, first identity data, second item data, and second identity data in a memory of an electronic marketplace from which the user interface is provided.

3. The computer-implemented method of claim 1, wherein receiving third system identity data of the third system in connection with the exemption request includes receiving the third system identity data via the third system entering the third system identity data into the user interface.

4. The computer-implemented method of claim 1, wherein receiving third system identity data of the third system in connection with the exemption request includes retrieving the third system identity data stored in memory of an electronic marketplace from which the user interface is provided.

5. The computer-implemented method of claim 1, wherein procuring includes:

transmitting a certificate request to a remote server, the certificate request including the first item data, the first identity data, the second item data, the second identity data, and the third system identity data; and receiving, in response to the transmitted certificate request, the first exemption certificate and the second exemption certificate from the remote server.

6. The computer-implemented method of claim 1, wherein procuring includes:

transmitting a certificate request to a remote server, the certificate request including the first item data, the first identity data, the second item data, the second identity data, and the third system identity data;

transmitting a selected rationale for the exemption requests and a selected jurisdiction; and receiving, in response to the transmitted certificate request, the first exemption certificate and the second exemption certificate from the remote server, wherein the first exemption certificate and the second exemption certificate are qualified in the selected jurisdiction based on the selected rationale.

7. The computer-implemented method of claim 1, wherein causing, via the user interface, the first exemption certificate and the second exemption certificate to be presented to the third system includes displaying the first exemption certificate and the second exemption certificate concurrently on a client device used by the third system via the user interface.

8. The computer-implemented method of claim 1, wherein electronically receiving a signature from the third system for each of the first exemption certificate and the second exemption certificate includes providing a single electronic signature field to the third system for both the first exemption certificate and the second exemption certificate, via the user interface.

9. The computer-implemented method of claim 1, wherein the electronically received signature is applied to both the first exemption certificate and the second exemption certificate.

10. The computer-implemented method of claim 1, wherein storing the signed first and second exemption certificates includes storing the signed first and second exemption certificates in a memory of an electronic marketplace from which the user interface is provided.

11. The computer-implemented method of claim 1, further comprising:

causing the user interface to display, responsive to the request to buy, a proposed payment for the first item, the second item, and a proposed payment of sales tax; and causing the user interface to display, responsive to electronically receiving the signature, a proposed payment for the first item and the second item without the proposed payment of sales tax.

12. The computer-implemented method of claim 1, further comprising:

causing a client device to display, responsive to the request to buy, a proposed payment for both the first item, the second item, and a proposed payment of sales tax; and causing the client device to display, responsive to electronically receiving the signature, a proposed payment for the first item and the second item without the proposed payment of sales tax.

13. The method of claim 1, further comprising:

storing third item data of a third item sold by a third seller and third identity data of the third seller;

facilitating the third system to form a request to buy the third item, the request to buy the third item including third item data, in the single transaction;

procuring, in response to the exemption request, a third exemption certificate including at least some of the third identity data and at least some of the third system identity data;

causing, via the user interface, the third exemption certificate to be presented to the third system;

electronically receiving a signature from the third system the third exemption certificate; and storing the signed third exemption certificate.

* * * * *